United States Patent [19]
Wrobel

[11] Patent Number: 6,154,739
[45] Date of Patent: Nov. 28, 2000

[54] METHOD FOR DISCOVERING GROUPS OF OBJECTS HAVING A SELECTABLE PROPERTY FROM A POPULATION OF OBJECTS

[75] Inventor: Stefan Wrobel, Duisburg, Germany

[73] Assignee: GMD-Forschungszentrum Informationstechnik GmbH, Sankt Augustin, Germany

[21] Appl. No.: 09/105,160

[22] Filed: Jun. 26, 1998

[30] Foreign Application Priority Data

Jun. 26, 1997 [DE] Germany .......................... 97 110 452

[51] Int. Cl.$^7$ .................................................. G06F 17/30
[52] U.S. Cl. ...................... 707/6; 707/3; 707/5; 707/100; 707/103
[58] Field of Search ............... 707/3, 5, 6, 100, 707/103

[56] References Cited

U.S. PATENT DOCUMENTS

| | | | |
|---|---|---|---|
| 5,794,209 | 8/1998 | Agrawal et al. | 705/10 |
| 5,933,818 | 8/1999 | Kasravi et al. | 706/12 |
| 6,012,058 | 1/2000 | Fayyad et al. | 707/6 |
| 6,029,195 | 2/2000 | Herz | 709/219 |

OTHER PUBLICATIONS

Zaki et al., "Localized algorithm for parallel association mining", Annual ACM Symposium on Parallel Algorithms and Architectures, 1997, Abstract Only.

Chen, Po–Chi, et al., "An ILP Based Knowledge Discovery System," *International Journal on Artificial Intelligence Tools*, 1997, vol. 6, No. 1, pp. 63–95.

De Ville, Barry, "Applying Statistical Knowledge to Database Analysis and Knowledge Base Construction," *Proceedings The Sixth Conference on Artificial Intelligence Application*, Mar. 5–9, 1990, pp. 30–36.

Dzeroski, Saso, et al., "Applying ILP to Diterpene Structure Elucidation from 13C NMR Spectra," *Proceedings 6$^{th}$ International Workshop on Inductive Logic Programming*, Aug. 26, 1996, pp. 41–54.

Emde, Werner, et al., "Relational Instance Based Learning," *Proceedings 13$^{th}$ International Conference on Machine Learning*, Jul. 6, 1996, pp. 122–130.

Quinlan, J.R., "Induction of Decision Trees," *Kluwer Academic Publishers*, 1986, vol. 1, No. 1, pp. 81–106.

*Primary Examiner*—Jean R. Homere
*Attorney, Agent, or Firm*—Birch, Stewart, Kolasch & Birch, LLP

[57] ABSTRACT

The method is for detecting a selectable number of groups of objects having at least one selectable characteristic from a population of objects specifiable by a plurality of attributes. The objects of the population are subdivided into object groups of a first order, on the basis of respectively at least one attribute. The quality of each object group of this order is detected, on the basis of the total number of its objects and the number of its objects having said at least one characteristic. Each object group of this order is included into the number of object groups to be detected, if the object group has a quality higher than the lowest quality of the object group among the object groups detected up to this point. A hypothetical quality is detected on the basis exclusively of those objects of this object group which have at least one of the characteristics. The hypothetical quality is a quality of a hypothetical group derived from the actually processed group and including exclusively the objects thereof having the at least one characteristic. All those object groups of this order the hypothetical quality of which includes a selectable quality value and particularly is of the quality of the respective object groups, are subdivided into object groups of the next lower order, by selecting at least one attribute.

13 Claims, 19 Drawing Sheets

| ID | Name | First Name | Street | City | State | Zip | Sex | Social Status | Income | Age | Club Status | Response |
|---|---|---|---|---|---|---|---|---|---|---|---|---|
| ... | ... | ... | ... | ... | ... | ... | ... | ... | ... | ... | ... | ... |
| 3478 | Smith | John | 38, Lake Dr | Sampleton | SA | 34677 | male | single | i60-70k | 32 | member | no-response |
| 3479 | Doe | Jane | 45, Sea Ct | Invention | IN | 43666 | female | married | i80-90k | 45 | non-member | response |
| ... | ... | ... | ... | ... | ... | ... | ... | ... | ... | ... | ... | ... |

FIG. 1

| ID | Zip | Sex | SoSt | Income | Age | Club | Resp |
|---|---|---|---|---|---|---|---|
| ... | ... | ... | ... | ... | ... | ... | ... |
| 3478 | 34677 | m | si | 60-70 | 32 | me | nr |
| 3479 | 43666 | f | ma | 80-90 | 45 | nm | re |
| ... | ... | ... | ... | ... | ... | ... | ... |

FIG. 2

| ID | Zip | Sex | So St | Income | Age | Club | Resp | Delivery Mode | Paymt Mode | Store Size | Store Type | Store Locatn |
|---|---|---|---|---|---|---|---|---|---|---|---|---|
| ... | ... | ... | ... | ... | ... | ... | ... | ... | ... | ... | ... | ... |
| 3478 | 34677 | m | si | 60-70 | 32 | me | nr | regular | cash | small | franchise | city |
| 3479 | 43666 | f | ma | 80-90 | 45 | nm | re | express | credit | large | indep | rural |
| ... | ... | ... | ... | ... | ... | ... | ... | ... | ... | ... | ... | ... |

FIG. 3

| ID | Zip | Sex | So St | Income | Age | Club | Resp | Delivery Mode | Paymt Mode | Store Size | Store Type | Store Locatn |
|---|---|---|---|---|---|---|---|---|---|---|---|---|
| ... | ... | ... | ... | ... | ... | ... | ... | ... | ... | ... | ... | ... |
| 3478 | 34677 | m | si | 60-70 | 32 | me | nr | regular | cash | small | franchise | city |
| 3478 | 34677 | m | si | 60-70 | 32 | me | nr | express | check | small | franchise | city |
| 3478 | 34677 | m | si | 60-70 | 32 | me | nr | regular | check | large | indep | rural |
| 3479 | 43666 | f | ma | 80-90 | 45 | nm | re | express | credit | large | indep | rural |
| 3479 | 43666 | f | ma | 80-90 | 45 | nm | re | regular | credit | small | franchise | city |
| ... | ... | ... | ... | ... | ... | ... | ... | ... | ... | ... | ... | ... |

FIG. 4

| ID | Zip | Sex | SoSt | Income | Age | Club | Resp | No. of Orders | No. of Stores |
|---|---|---|---|---|---|---|---|---|---|
| ... | ... | ... | ... | ... | ... | ... | ... | ... | ... |
| 3478 | 34677 | m | si | 60-70 | 32 | me | nr | 3 | 2 |
| 3479 | 43666 | f | ma | 80-90 | 45 | nm | re | 2 | 2 |
| ... | ... | ... | ... | ... | ... | ... | ... | ... | ... |

FIG. 5

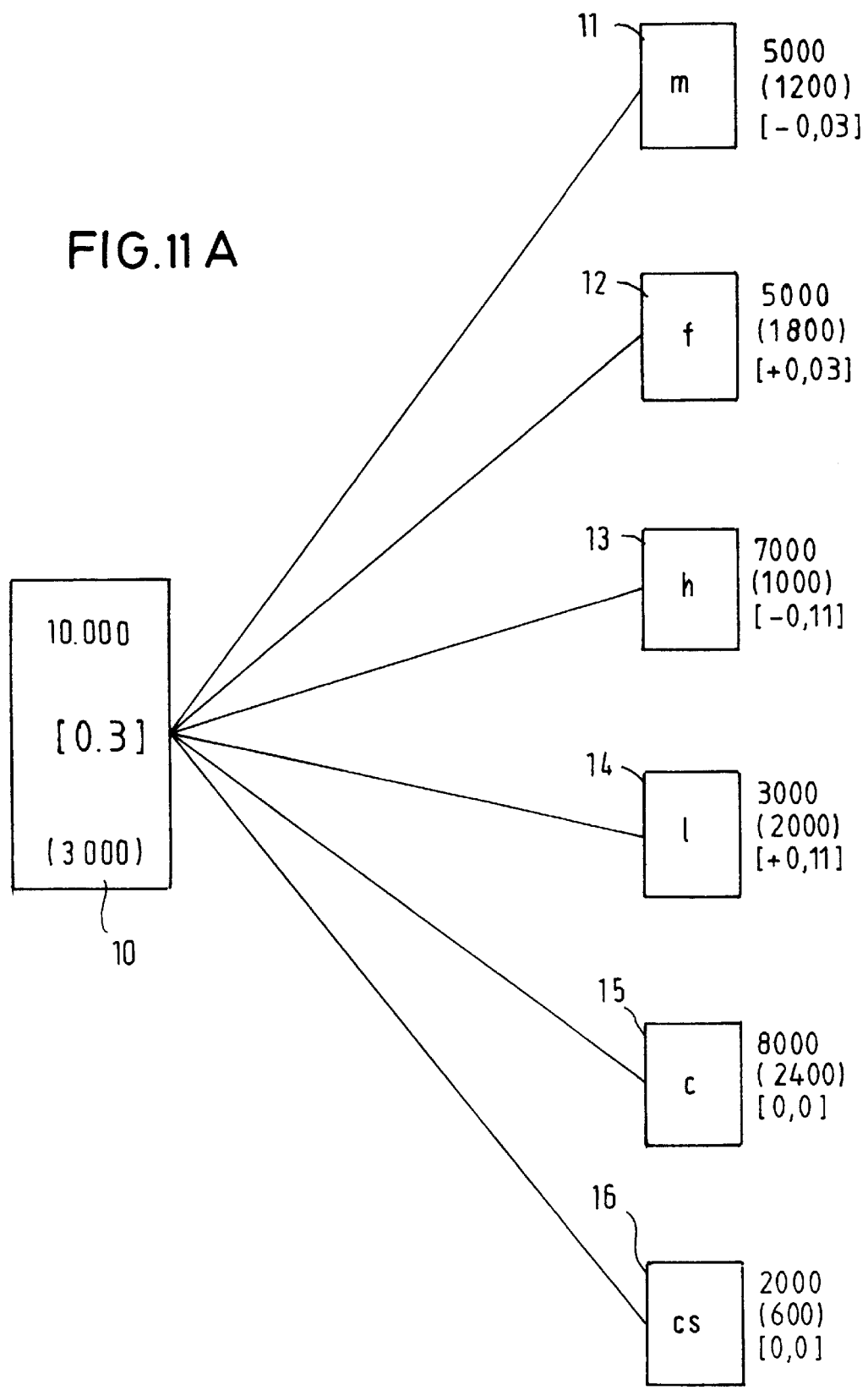

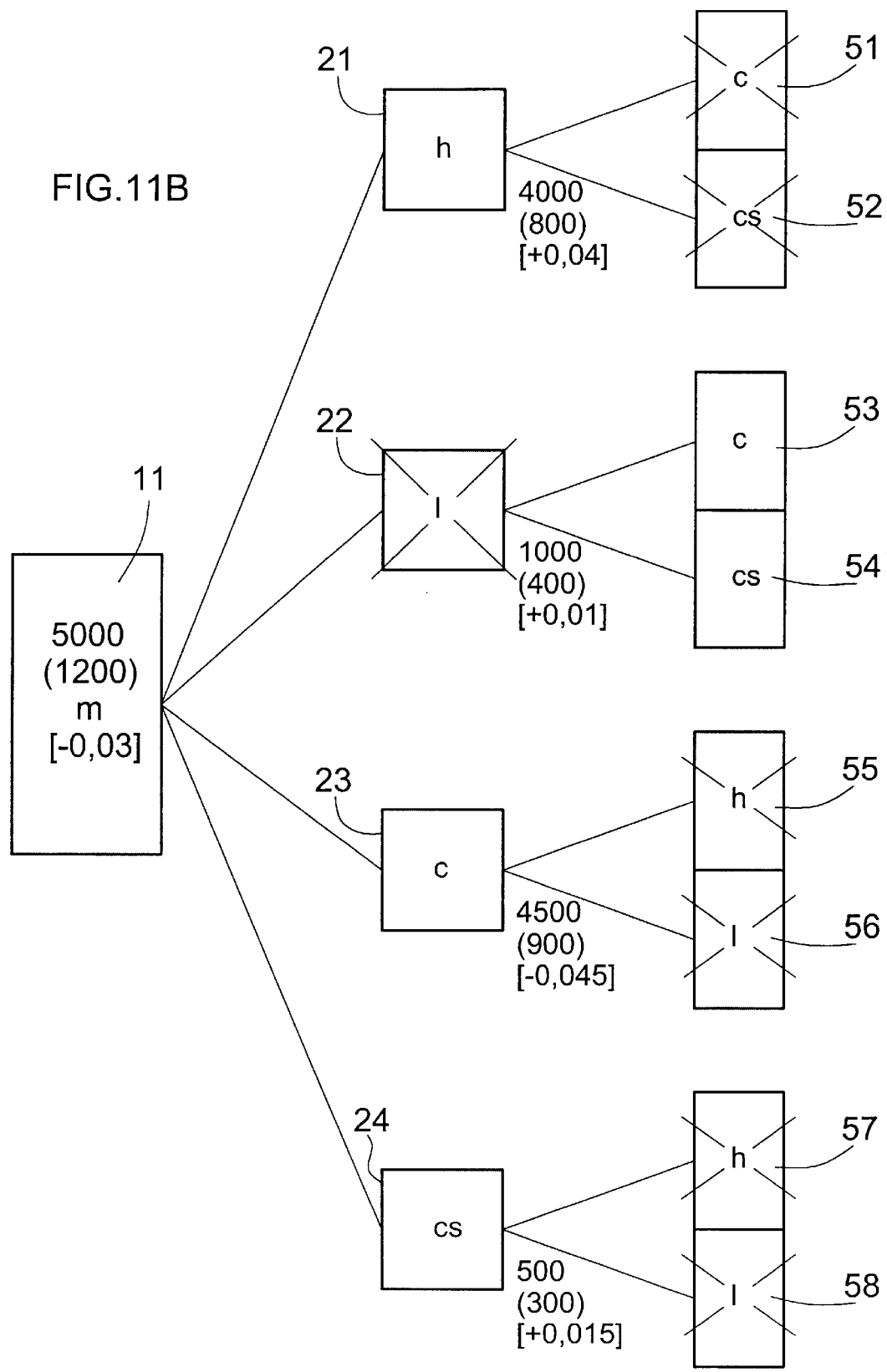

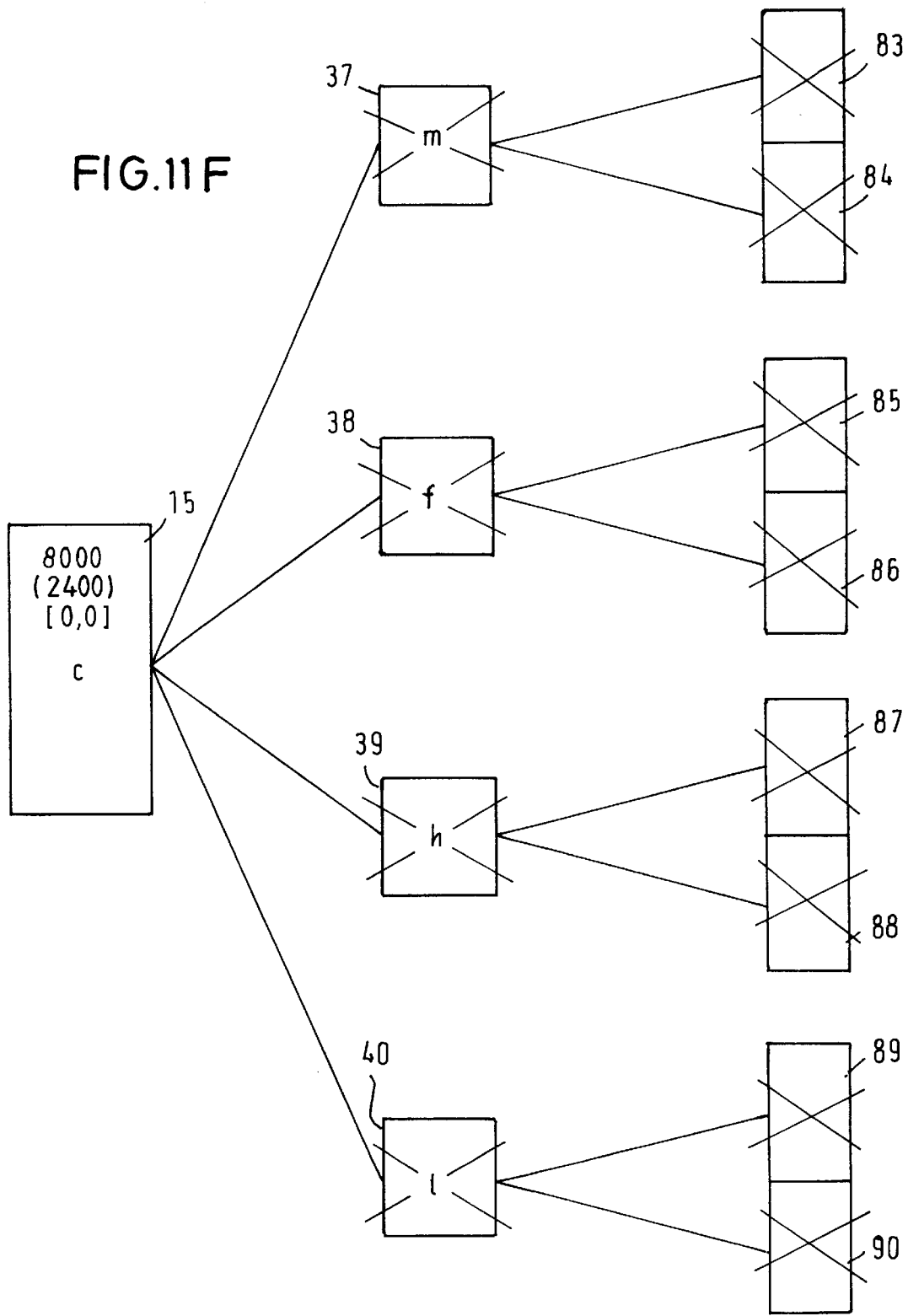

METHOD FOR DISCOVERING GROUPS OF OBJECTS HAVING A SELECTABLE PROPERTY FROM A POPULATION OF OBJECTS

BACKGROUND OF THE INVENTION

1. Field of the Invention

The present invention relates to a method for detecting a selectable number of groups of objects having at least one selectable characteristic from a population of objects specifiable by a plurality of attributes, each of said object groups having a quality which, by means of a selectable function, results-from the number of objects of the object group and from an unusualness of the distribution of the characteristic within the object group and which is detected by a relation between the distribution of the characteristic of the respective object group and the distribution of the characteristic in a reference population.

2. Description of the Relevant Art

Data Mining, or Knowledge Discovery in Databases (KDD), as it is referred to in the research world, has recently been gaining widespread attention. In one popular definition, KDD is seen as the "automatic extraction of novel, useful, and valid knowledge from large sets of data" [FPSS96]. As this definition indicates, KDD offers a general body of techniques that are capable of finding different kinds of "knowledge" in different kinds of data. A data mining task can only be defined precisely when it is exactly specified what kind of knowledge is to be found in which form, and in which way the data for analysis are available in a storage file or database system.

The searching in databases for data patterns having selectable characteristics, i.e. the detecting of objects having a selectable characteristic among a population of objects is no longer a trivial task, particularly if the population comprises a very large number of objects. In case the of relatively small amounts of data and resp. a relatively small population, the task of detecting specific objects will be accomplished by examining each object of the population separately. In the case of relatively large amounts of data, such an approach is not economical anymore. A reasonable approach in this regard resides in that the objects of the population, which can be described by means of attributes, are divided—according to corresponding predetermined attributes—into objects groups whose objects have the corresponding attribute. In this manner, the population is hierarchically subdivided into object groups which in turn will be further subdivided into object groups.

It is a frequently posed task to perform a search in a database to detect object groups whose objects have a predefined characteristic which occurs unusually often within the object group. This "unusual" statistic characteristic is to be seen in relation to the statistic occurrence and resp. frequency of this characteristic in a reference population. Such a reference population can be either the (total) population of the objects or a subset of the objects of the total population, particularly an object group. Normally, however, apart from the "unusualness" of an object group to be detected, also the size of the object group is significant. Particularly, in a large number of applications, it is desirable to detect object groups of the largest possible size and the highest possible unusualness. Therefor, the unusualness is linked to the number of objects of an object group through a functional relationship so as to define the "quality" of a group. Thus, it is desired to examine large quantities of data for groups of data having specific minimum qualities. A case in point would be the situation wherein a company, intending to introduce a new product, plans a mail advertising campaign and, for reducing the effort involved, seeks to address only such groups of persons which are conceivable as potential buyers of the product. If, for instance, an opinion survey is to be conducted, only such persons should be surveyed who correspond to the "average" of the population and resp. the average part of the population relevant for the evaluation of the survey.

SUMMARY OF THE INVENTION

It is the object of the present invention to provide a method for discovering groups of objects having a selectable property from a population of objects, wherein the discovery of the groups of interest can be performed rather quick even if the data base used is very large.

The method of the instant invention is useful to detect a selectable number of object groups from a population of objects, wherein the selectable number of object groups have the best qualities with regard to the selectable characteristic when compared to all of the object groups of the population. Thus, one will obtain not only an object group having the best quality but, moreover, a selectable number of object groups having the highest-ranking qualities. In the method of the invention, there is first selected the characteristic which is desired to exist with the most eminent quality in the object groups to be detected. Such a characteristic comprises one or a plurality of attributes by which the objects of the population can be specified. On the basis of the-remaining attributes, the population will then in a step-wise procedure be hierarchically divided into object groups of first, second or further groups. Thus, this first stage of the hierarchical subdivision will result in a plurality of object groups which differ from each other by at least one attribute. Now, all of these object groups of the first order are examined with regard to their quality. In the process, the object groups are filed in a list or in another manner in the order of their qualities. The entries in the list will correspond to the number of the. object groups to be detected. If there is demanded—in addition to the quality ranking, i.e. the degree of the quality of the object groups—also a specific minimum number of objects per group, the primary criterion for inclusion into the list will be how large the object group is. Thus, object groups which do not exceed a minimum size will not be included into the list even if their quality is higher than that of an object group already included or all of the object groups already included.

According to the invention, prior to the subdividing of the object groups of the first order (generally n-th order) into object groups of the second order (generally n+1-th order), there is detected the degree of the best possible quality of an object group obtained from the respective object group by further subdivision. If, for instance, an object group to be subdivided comprises a number of h objects of which a number of i have the selected characteristic and a number of j do not have the selected characteristic, so that h=i+j, then, for the situation in the most favorable case—i.e. that the further subdivision of this object group into object groups of the next-lower order would result in an object group comprising all objects of the to-be-divided object group which have this characteristic or all objects which do not have this characteristic—the quality of this object group is detected. Thus, it is assumed that, by further subdivision, the object group comprising said h objects will result in an object group comprising exactly said j objects or exactly said i objects of the object group with said h objects. Then, from the number of each of these object groups and from the unusualness of the distribution of the selectable characteristic, first and/or second hypothetical qualities are detected. If the first and/or second hypothetical quality has already been selected to be lower than the lowest quality of the object groups already detected and entered in the list, then that object group by which the first and resp. second hypothetical quality has been selected, is disregarded in the further subdivision of the object groups. The remaining object groups are then subjected to a further hierarchical subdivision, and the options described above for the first subdivision step are repeated. This process is continued until a selectable criterion for termination (lapse of time, reaching the lowest order in object groups etc.) has been fulfilled.

Thus, the method of the invention specifically utilizes the fact that the time required for detecting interesting objects of a population of objects can be shortened by not examining all of the objects of the population and resp. all object groups of the population. In this regard, the manner of determining that specific object groups need not be examined is of decisive importance. According to the invention, an estimation process is performed for detecting the quality to be expected under the most favorable circumstances for an object group generated by further subdivision of an already examined object group. This process of "pruning" as provided by the invention, i.e. the "cutting off" from a branch of the hierarchical subdivision tree of the population will also be referred to a "optimistic estimate pruning".

As already explained above, when selecting object groups to be detected, also their size can be of decisive significance. In the further subdividing of the population or object groups, the preselected size likewise serves as a criterion as to whether or not an object group will still be considered in the further detecting process. Notably, also by this measure, the method of the invention can be abbreviated. This approach will also be called "minimal support pruning".

The time required for the examination of object groups of the population can be advantageously minimized also in that, when the hierarchical subdivision at a subdivision stage results in object groups wherein the combination of the attributes defining these object group is identical, only one of these object groups is examined and, if applicable, is further subdivided. This is of interest particularly in those cases where the hierarchical subdivision from step to step is performed by means of a plurality of different attributes, i.e. where the hierarchical tree from step to step is divided into more than two branches and the attributes which for the subdividing of the object groups at the current subdivision stage have already been used before in the subdivision at an earlier subdivision stage, are identical.

The criterion for determining the order in which the object groups to be processed at the individual subdivision stages are examined, can be different from one subdivision stage to the next one or can be the same. Thus, for instance, it is possible to select these object groups at random or deterministically to then process them according to this selection. If a maximum allowable time period for the detection of interesting groups has been set, it is suitable at each subdivision stage to process the to-be-treated object groups corresponding to the order of their qualities.

A possible criterion for termination—besides the lapse of a selected time period—could reside in that the subdivision process is terminated when only object groups with a selectable minimum number are generated. Particularly, this minimum number is equal to that minimum number (if preset at all) starting from which the inclusion of object groups into the list of interesting object groups is possible at all.

As a criterion for the order in which the still-to-be-examined groups of a subdivision stage are processed, use can be made also of the size of the first and/or second hypothetical quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be further described in connection with preferred embodiments and examples shown in the drawings, in which:

FIG. 1 is an example for a basic customer table,

FIG. 2 is an example for a customer table for analysis,

FIG. 3 is an example for a customer table including order and store information, FIG. 4 is an example for a customer table with multiple orders, FIG. 5 is an example for a customer table using summary attributes.

DETAILED DESCRIPTION OF THE INVENTION

Figure 6:
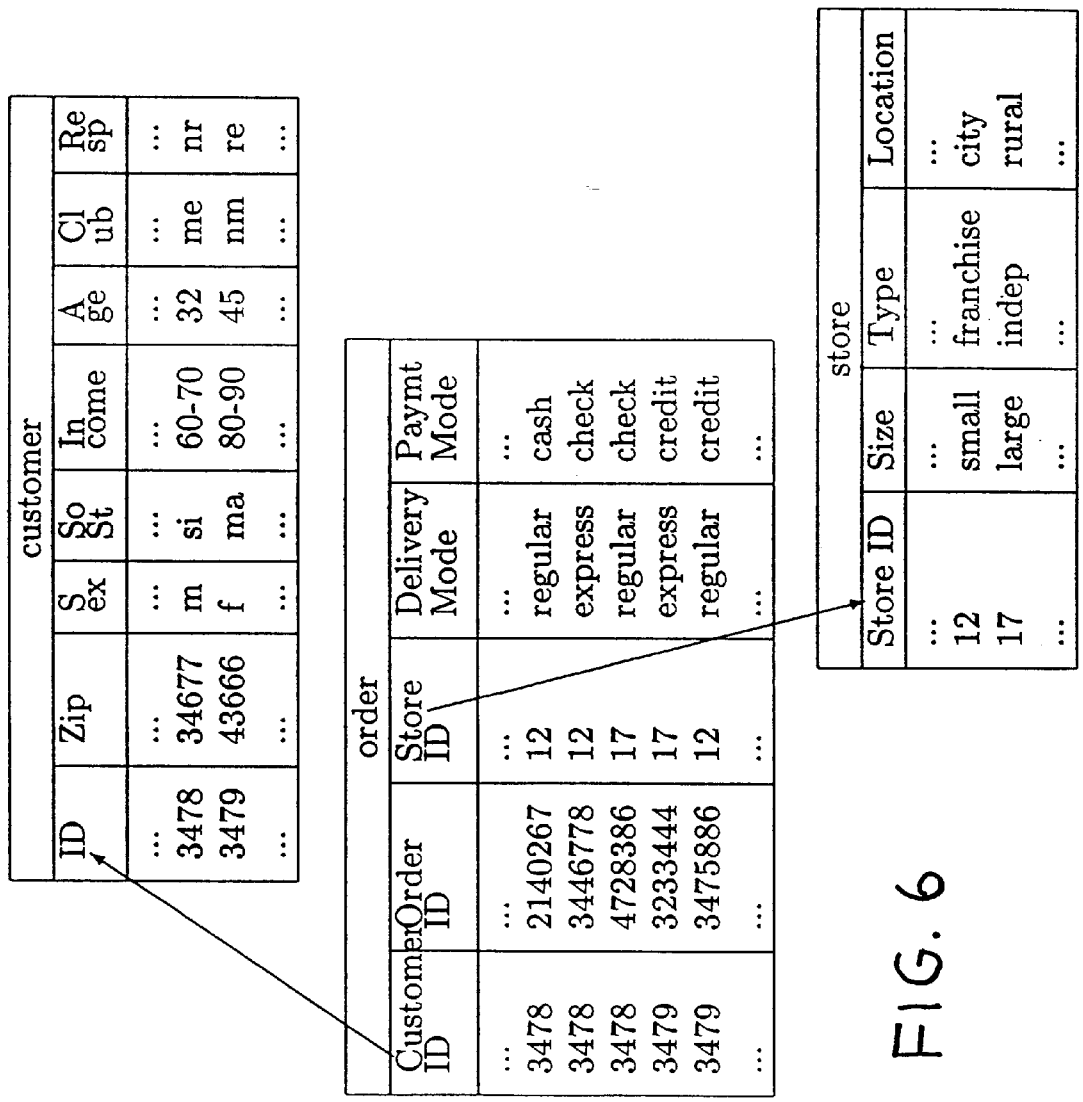
FIG. 6 is an example for a relational representation of customers, orders, and stores.

As for the knowledge that is to be discovered, rules, decision trees, cluster hierarchies, association rules or statistically unusual subgroups are just a few examples (many of which are further described in other chapters of this specification). Here, we will focus our attention on the form of the data that are available for analysis, and more precisely, on the question of using a single table or multiple tables for analysis. As we will see in the remainder of this section, using only a single table for analysis, despite being the standard in most current data mining systems, is too restrictive and does not correspond to the state of the art in database systems where relational technology with multiple tables has long been the standard.

We will then deal with the question of how to directly use multiple tables for analysis, introducing results from the field of Inductive Logic Programming (ILP) which has been concerned with relational analysis technology for a number of years now, and has now reached a state of maturity sufficient for practical applications. Finally, we will describe the new relational method for subgroup discovery named MIDOS.

1.1 The single-table assumption

In the commercial world, KDD and Data Mining have up to now always used a very important simplifying assumption about the form of available data which we will refer to as the "single-table assumption": it is assumed that all data are stored in a single table (or "relation" in database terminology), and that there is one row (or "tuple") in this table for each object of interest. This is also referred to as a "propositional" or "rectangular table" representation. In a typical commercial application (e.g. database marketing), we would have a customer table with each line representing one of our customers, and the columns of the table representing different "attributes" of our customers (FIG. 1).

The first field shows a customer's ID number, the subsequent fields his or her name and address. If we assume we require each new customer to fill in a small questionnaire (and assume our customers really do this), we also would have this kind of information, stored in the four fields. At the end, there is an attribute specifying whether this customer is a member of our buying club, and whether the customer responded to a recent direct mail campaign.

For analysis purposes, fields like name and exact address are uninteresting, since we are looking for general information about our customers, not specific information that applies only to one person. Thus for analysis, we would use a smaller table as shown in FIG. 2 (introducing a number of space-saving abbreviations for field names and field values).

From such data, traditional data mining software can produce different kinds of knowledge: decision tree algorithms induce models that predict whether a certain customer will reply to a future mailing, clustering algorithms segment our customer base into homogeneous groups that can be treated together in marketing campaigns, etc.

1.2 Problems with the single-table assumption

Furthermore, since we can add as many attributes about our customers as we would like, at first sight it seems that a single table would be all we would ever need to represent everything we know about our customers, so that the single-table assumption made by traditional software would be no problem whatsoever. For the kind of general customer information recorded in the table from FIG. 1, this is certainly correct. If we wanted to add information about a person's number of children, we would simply add another attribute.

However, for other kinds of valuable information about our customers, the single-table assumptions turns out to be a significant limitation. Assume we would like to add information about the orders placed by a customer, and would also like to include the delivery and payment modes and with which kind of store the order was placed (Size, Ownership, Location). For simplicity, we will not include information about goods ordered.

We might consider augmenting our table by additional columns as in FIG. 3, using one column to indicate the delivery mode, a second to indicate payment mode, a third for store size, a fourth for store type and a fifth for store location. While this works well for once-only customers, what if our business, as any good business, has repeat customers who have ordered several times? If all our data mining method can handle is a single table, we are left with two equally unsatisfying options.

First, we could make one entry for each order in our customer table. Thus, if Mr. Smith (customer 3478) places three orders, he will be represented by three lines in the table, each duplicating his customer information fields (FIG. 4).

Moreover, store information is also repeated for each customer and order. Thus, all the information is in our table, but it is stored redundantly. This not only wastes space, it also creates a number of problems. If there is an error in the data that represent Mr. Smith, it needs to be corrected in every row, not only in one single place. Even more importantly for analysis purposes, single-table analysis methods usually assume that each row represents one object of interest, i.e. one customer in our case. Since we now have one line per order, not per customer, analysis results will really be about orders, not customers, which is not what we might want.

The second option avoids redundancy at the expense of information detail. With a little creativity, the analyst might conclude that perhaps only the number of orders and the number of stores in which orders were placed are important. We could then create two new attributes as in FIG. 5.

This avoids problems with redundancy and multiple rows, and thus allows analysis methods to operate properly on the resulting table. However, there is a lot less information in the new table. What if our analyst's opinion was wrong, and knowledge of the exact combinations of payment modes, delivery modes and store types is important after all? Our analysis methods cannot use this information, so again the results will not be as good as they could be if all information were used.

1.3 The solution: relational representation

In the world of database systems, the problems inherent in the single-table representation have long been recognized and addressed by so-called "relational" database that are capable of representing information as a set of different interlinked tables. Today, even popular desktop databases have relational capabilities, and only the very simplest address managers are still restricted to single tables. In database terminology, a single table in the form described in our first solution above is said to be a "non-normal form" database and is considered bad database practice. Instead, database designers would represent the information in our sample problem as a set of tables as depicted in FIG. 6.

Here, we have one master table "customers" representing general information about each customer, and there is exactly one line per customer. Orders are described in a second table "orders", containing one line per order. The central element of relational technology is the use of identifiers that point to another table. In the "orders" relation, one field contains the customer id, so if we want to know which customer placed an order, we simply go to the "customer" relation, find the row with this customer id value, and get the required information. A field in a relation that points to a key field field in another relation is often called a "foreign key", indicating that the value in this field is required to be a key value in the other relation. The arrows in FIG. 6 represent the foreign key relations in our example. The same principle is used to represent the store information: the "order" table uses the store id to refer to "store" which in turn describes each store.

1.4 Examples of relational representations

1.4.1 A car manufacturer's database

Figure 7:
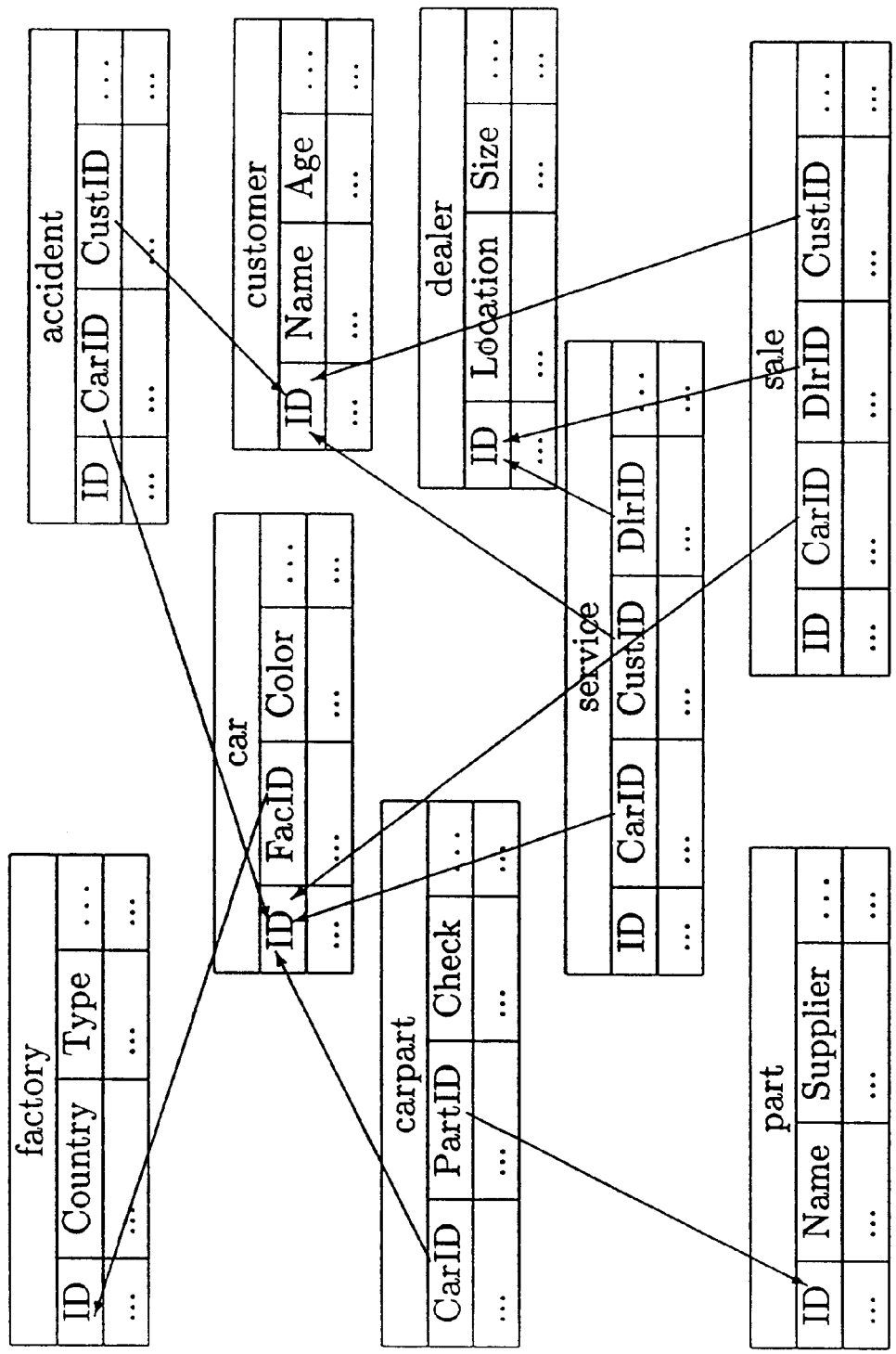
FIG. 7 is an example for a car manufacturer's relational data base.

The relational representation thus quite naturally allows us to represent the required information in our simple example. In fact, it is so popular because it has turned out sufficient for almost any kind of data representation problem, and most commercial databases have the general structure of our little customer database. As a more complex example from a more technical domain, consider a car manufacturer who wants to represent information about each car manufactured, the manufacturing plant where the car was built, the parts built into the car, the dealer who sold the car, the customer who bought it etc. etc. All of this could easily be represented in a relational database, perhaps the one shown in FIG. 7.

1.4.2 Non-rectangular questionnaire data

Figure 8:
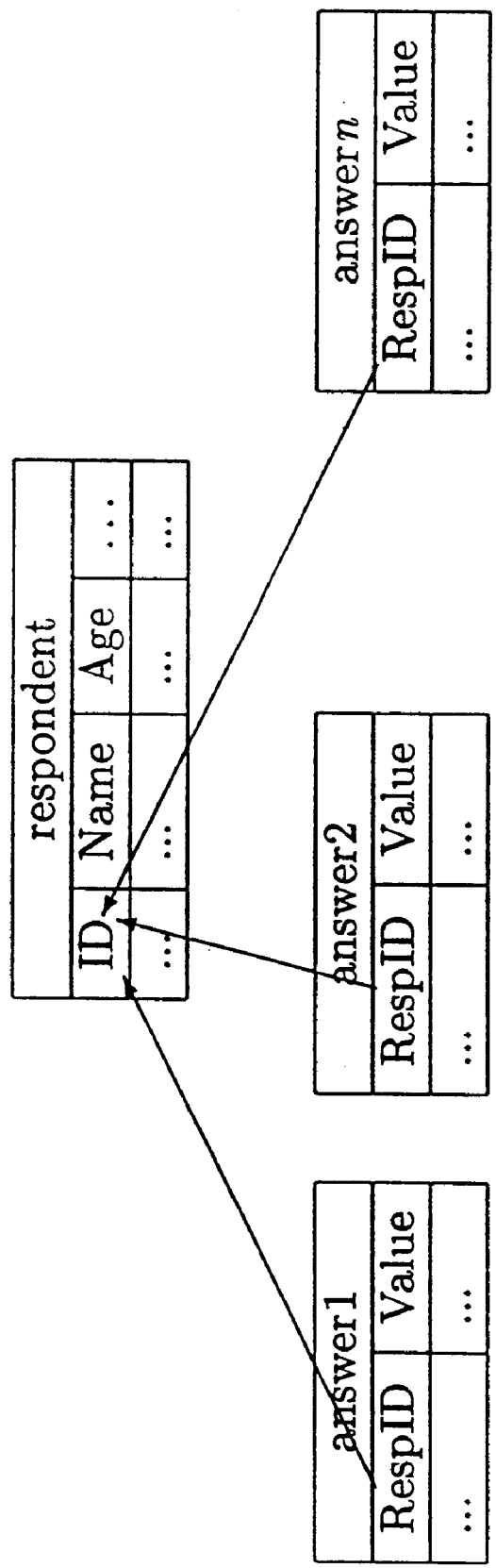
FIG. 8 is an example for a relational representation of rectangular questionnaire data.

Another popular application for data mining is analysis of questionnaire data. Even though in principle a questionnaire can be represented as a single table, each column containing the answer for one question, in practice questionnaires are somewhat more complex. First, respondents may choose not to answer a question, creating an empty value. Such empty values (or "null" values) cannot be handled properly by most analysis algorithms - - - they would treat "null" as an ordinary value (just another possible answer), which is not appropriate in many circumstances. This is even more evident when we have different questions blocks ("If you marked single in question 10, jump directly to question 23, otherwise, please answer 11 to 22."). We could simple leave these attributes blank, but again, using them in the result of an analysis would not make sense for single persons. And last, if we allow multiple answers to each question ("which hobbies to you have"), in a single table we need to create binary attributes, one for each possible hobby (meaning we have to fix the list of possible hobbies). In a relational representation, none of these present problems. If we use a master relation with one entry per respondent, we can have a separate relation for each question, containing zero (if the question was unanswered), one or many tuples per respondent, see FIG. 8.

1.4.3 Chemical applications

Figure 9:
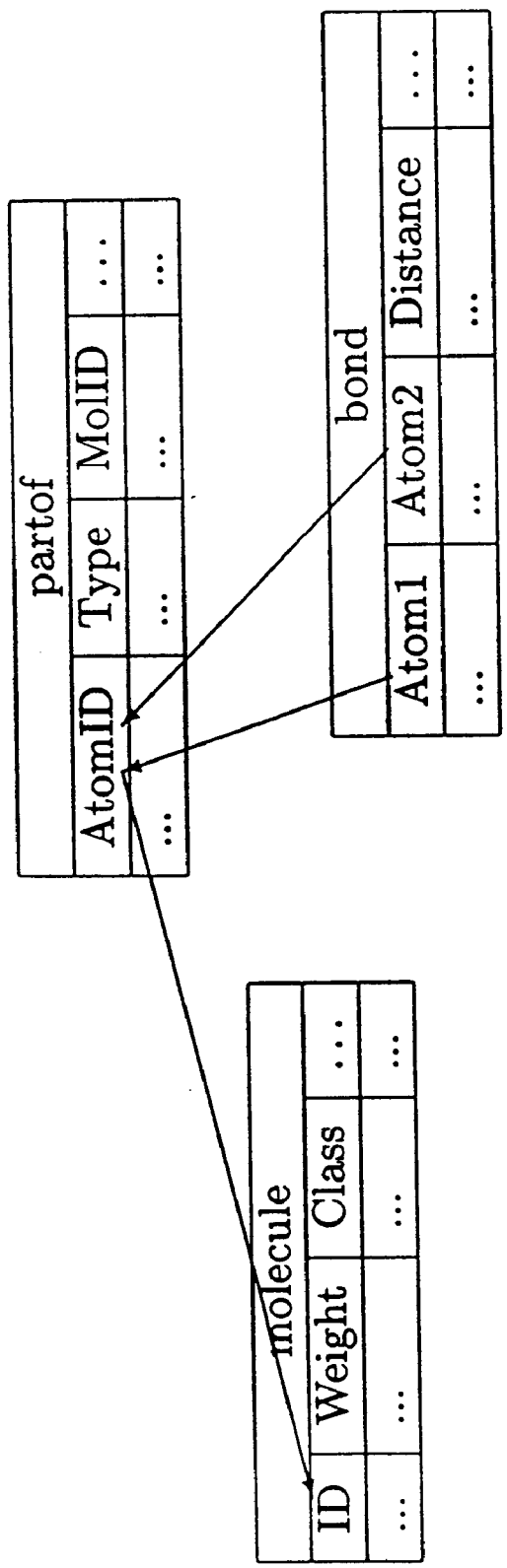
FIG. 9 is an example for a relational representation of molecules, atoms and bonds.

Finally, for a chemical application, assume we would like to represent chemical molecules and their component atoms. As shown in FIG. 9, it is equally possible to represent this information in a relational form, using a relation "part-of to indicate that an atom is a part of a molecule, and a relation "bond" to indicate that there is a bond between two atoms.

Note that even if we do not require the bond information, we cannot simply make a large number of columns in a single table called something like "atom 1" to "atom 23" (where 23 would be the number of atoms in the largest molecule). First, this would mean a lot of columns would be unused, meaning we need-the problematic "null" values (whenever a molecule has less than 23 atoms). Worse, putting one of the atoms in the column "atom 1" would assign a numbering to the atoms that is not taken from reality, but assigned arbitrarily. Unfortunately, the way a single-table method works is that when trying to generate a model, only the values from the same column are compared to one another. Since the arbitrarily assigned "atom 1" elements from two different molecules are most likely not the functionally matching atoms at corresponding places in these two molecules, the analysis method will have no chance to discover the right model. Furthermore, our model might need to use not only information about particular atoms, but also information about their bonded neighbors and the neighbors of the neighbors, etc. The structure of these chemical problems occurs in a similar fashion in technical applications, e.g. when we try to describe a power network or electrical circuit, where a faulty component has a non pre-determined number of neighbors, or when analyzing processes where predictions depend on predecessor states at varying temporal distances. None of these problems can be represented at all in a single-table representation.

2 ILP: Relational Analysis Technology

We have thus seen that for almost all domains, it is very advantageous and often even necessary to use the power offered by relational technology and store available information in multiple relations. If we then want to analyze this information, current data mining tools based on the single-table assumption are ill-equipped to do the job. Either we invest a lot of thought and effort into pressing as much of the required information as necessary into a single table, perhaps producing redundancy and other problems, or we accept that these methods simply ignore a large part of the available information. Would it not be nice to have analysis methods and data mining systems capable of directly working with multiple relations as they are available in relational database systems?

Fortunately, the research field called "Inductive Logic Programming" (ILP) has been asking exactly this question for a number of years now, and after a number of successful research prototypes, we are now seeing the first commercial data mining systems with ILP technology becoming available. These systems have already successfully solved applications of the types described above.

Especially in the field of chemistry/biology, ILP has had remarkable successes and has proven its superiority to other techniques. In the so-called "predictive toxicology evaluation" (PTE) challenge, the ILP system PROGOL induced the best performing classifier, beating hand-crafted expert systems and classical propositional techniques like regression. In another application, the ILP system proved superior to propositional nearest neighbor and decision tree algorithm in the prediction of Diterpene classes from nuclear magnetic resonance (NMR) spectra. Several other applications of this type have been reported. Other applications outside of chemistry include e.g. analysis of survey data in medicine, analysis of traffic accident data, and prediction of ecological biodegradability.

In this specification, we cannot describe the theoretical foundations and main technological ingredients of ILP in an encompassing fashion. The goal of the preceding sections of this specification was to illustrate why you should be interested in relational technology and ILP even if you are not dealing with the problems in biochemistry or natural language for which ILP has become famous. In fact, we hope to have demonstrated that relational analysis technology is useful even when you are dealing with Data Mining and KDD problems in very down-to-earth domains like customers and their orders. The main thing you need to know about ILP to use its methods is how data and analysis results are being represented—and of course, just what kind of knowledge is being discovered, i.e., which analysis task is being adressed. As for the knowledge representation, you are already familiar with it from the examples in the preceding section, except that ILP methods often use the notation popular from logic programming languages like Prolog (this is the "LP" in ILP). In logic programming, each row in a table or relation is represented by a fact (a positive literal) of the form <tablename>($<v_1>, \ldots, <v_n>$)

where <tablename> is called the predicate, and the $<v_1>\ldots<v_n>$, the column values, are the arguments. Customer information about Mr. Smith (customer 3478) and Mrs. Doe (customer 3479) would thus be represented as two facts customer(3478,34677,male,single, i60-70k,32,member,no_response).

customer(3479,43666,female,married, i80-90k,45,nonmember,response).

In fact, ILP is even more powerful than relational databases, since arguments can be not only simple values, but nested structures called terms. Since terms go beyond what relational databases can do, and are not necessary for most applications, we will not describe them here. A little more complex for those not familiar with logic programming or Prolog is how ILP represents analysis results. Since we want to express general properties about unknown objects, we use variables to stand for unknown values. An expression with variables "stands for" all entries in a table for which matching values for all variables (and non-variables) can be found. A special variable "_" is used when we do not care which value was used. For example, customer(_,_,female,_,_,_,_,_)

stands for all female customers in our customer relation. If we want to refer to groups of objects that require more complex descriptions involving multiple relations, we combine several such so-called literals with a logical "and" (conjunction), written as "," or "&". By using the same variable several times, we can easily represent the relational links between different relations. In contrast to all other variables, if "_" is used-multiple times, each occurence may refer to a different value. Also, two different variables may or may not refer to the same value. For example, customer(C,_,female,_,_,_,_,_),
order(C,_,_,_,credit_card)

stands for all female customers C who have ever placed an order paid for with a credit card. If relations have a large number of arguments (in real-life KDD applications, several dozens or even hundreds of arguments are not uncommon), this representation becomes very hard to read, since typically only a few field values are actually different from "_". Thus, an-alternative representation is sometimes used, e.g. in the MIDOS analysis method (see below):

customer.Sex=female,
customer.ID=order.Customer ID,
order.Paymt Mode=credit_card or, if the base relation we are interested in ("customer") is always the same, simply Sex=female,
ID=order.Customer ID,
order.Paymt Mode=credit_card Often, we want to make predictions about each member of such a group. Assume we had another one-argument relation "good-customer" containing as its single argument the IDs of all customers that we classify as good customers. If indeed female credit-card customers are good customers, an ILP system like PROGOL might induce the following if-then rule ("clause") from our database:

good-customer(C) :- customer(C,_,female,_,_,_,_,_),
order(C,_,_,_,credit_card)

As in Prolog, the two parts of the rule are separated by the symbol ":-", the left-hand part is called the "head", the right-hand part the "body" of the clause, to be read: "If a female customer has ever placed an order paid-for by credit card, then she is to be classified as a good customer." Often, rules are written in a more classical logical notation body-first with an implication arrow:

customer(C,_,female,_,_,_,_,_),
order(C,_,_,_,credit_card)
-> good-customer(C)

Many ILP analysis algorithms offer an additional feature: they let you enter rules such as the one above, and automatically use them in their analysis process. This means you need not enter or generate every relation explicitly (as so-called "extensional" relations), but you can simply define new relations with clauses, and the analysis algorithm will use these so-called "intensional" relations as if they had been explicitly generated. Intensional definitions are not only more practical, they are actually even more powerful than extensionally given relations, e.g. for recursively defined concepts like "connected-to" in a network. If you work with an algorithm that cannot accept rules directly (or simply prefer to generate relations explicitly), the data mining platform that you use should offer facilities for taking rules and generating relations from them. Such rules, and generally all relations except the "target" relation, are often referred to as "background knowledge" to be used by the analysis method.

3 ILP subgroup discovery: MIDOS

Even though we cannot dive into the detailed theory and mechanics behind ILP algorithms, this specification would be incomplete without a short look at the mechanics of at least one ILP method. ILP systems for inducing predictive or descriptive rules are described in other chapters, so for our purposes here we will illustrate a method for the task of subgroup discovery, one of the most popular tasks in data mining. Even though the basic method is simple, we can use it to illustrate several techniques that are used in ILP to achieve good performance on larger data sets.

But let us first define the task of subgroup discovery more precisely. In subgroup discovery, we assume we are given a so-called "population" of individuals (objects, customers, . . . ) and a property of those individuals that we are interested in. The task of subgroup discovery is then to discover the subgroups of the population that are statistically "most interesting", i.e., are as large as possible and have the most unusual statistical (distributional) characteristics with respect to the property of interest.

In our customer application, there are several subgroup discovery tasks in which we could be interested. We might want to find groups of orders with unusual distributions across stores, or look at groups of customers with unusual distributions across club membership or mailing response. If we pick club membership as our property of interest, one possible interesting subgroup returned by MIDOS could be (shown as it would appear in MIDOS' log file):

Target Type is: nominal([member,non_member])
Reference Distribution is: [66.1%,
33.9% - 1371 objects]
Sex=female,
ID=order.Customer ID,
order.Paymt Mode=credit_card [69.9%,
30.1% - 478 objects] [1.53882%%]

We see that the entire population consisted of 1371 objects (i.e., customers) of which 66.1% are club members. In contrast, in the subgroup of female credit card buyers (478 customers), 69.9% are club members. This finding is assigned a quality value of −1.53882%% by MIDOS. Normally, we ask the system for a certain number of interesting subgroups, and MIDOS will return a list ranked by the quality value.

Target Type is: nominal([member,non_member])
Reference Distribution is: [66.1%,
33.9% - 1371 objects]
ID=order.Customer ID,
order.Delivery Mode=express,
order.Paymt Mode=credit_card [72.0%,
28.0% - 311 objects] [2.07221%%]
Age=a40_50,
ID=order.Customer ID,
order.Paymt Mode=check [57.9%,
42.1% - 152 objects] [1.67213%%]

Income=i50_60k,
Response=no_response [60.4%, 39.6% - 270 objects]
[1.60067%%]
Sex=female,
ID=order.Customer ID,
order.Paymt Mode=credit_card [69.9%,
30.1% - 478 objects] [1.53882%%]
ID=order.Customer ID,
order.Store ID=store.Store ID,
store.Size=large [61.5%, 38.5% - 353 objects]
[1.47391%%]
ID=order.Customer ID,
order.Delivery Mode=express [69.3%,
30.7% - 515 objects] [1.26099%%]
Income=i60_70k [70.6%, 29.4% - 289 objects]
[1.08419%%]
Sex=male,
Income=i60_70k [72.4%, 27.6% - 163 objects]
[1.07433%%]
Age=a60_70,
Response=no_response [71.5%, 28.5% - 200 objects]
[1.0023%%]
Sex=female,
ID=order.Customer ID,
order.Delivery Mode=express [70.6%,
29.4% - 252 objects] [0.933171%%]

More complex subgroup discovery tasks result when multi-valued or numerical properties are considered. So if we had stored the total amount of each order in our database, we might consider analyzing whether there are any subgroups that have an unusually high average order amount, or even whether one subgroup has an unusually high share in all purchases. Since these analyses are not yet supported in the current release of MIDOS, we will not discuss them further here.

3.1 Use of subgroup discovery results

So how does one use subgroup discovery results, and how are they different from the results of predictive data mining algorithms? The typical use of subgroup discovery results is as a generator of ideas about phenomena in our application domain. For example, based on the analysis shown above, we might want to target the group of check payers aged 40 to 50 who show an unusually low rate of club membership.

Of course, a word of caution is important with respect to unreflected use of such subgroup discovery results (and in fact, with respect to unreflected use of any kind of data mining/knowledge discovery result). The subgroup discovery method does guarantee that a reported subgroup indeed possesses the distributional properties that are reported (this is simply a matter of counting correctly). Since no assumptions about the population and the distributions of the statistical phenomena that generate the data are used, however, the method cannot guarantee that the discovered subgroups represent general effects in reality that are statistically signifcant and can be reported and taken for true without further thought.

So if we find that check payers aged 40 to 50 are club members less frequently, we must carefully analyze whether this could be due to the way the sample was chosen, and after all, we only have information about our own customers, so the effect could be due to the way we "recruit" our customers. A properly validated statistical statement like "check payers aged 40 to 50 are less like to be club members" would require making distributional assumptions in order to determine the likelihood of error (i.e., the chance that check payers aged 40 to 50 are no different than the entire population when it comes to club membership). Subgroup discovery thus functions as a convenient hypothesis generator for further analysis, not as a statistical oracle that can be blindly trusted. Its usefulness lies in the computer's power to quickly screen large number of hypotheses (hundreds of thousands of subgroups) and report only the most interesting ones, and its capability of considering hypotheses with a large number of factors where humans would consider only a handful of hypotheses with one or two factors (and thus might miss the truly surprising things that one would have never thought of).

The difference between the subgroups analysis task (on the simple binary property problem) and the prediction analysis task is twofold. On the downside, the discovered subgroups cannot be used for predictive purposes. If we know that the group of female credit card payers contains club members with a relative frequency of 69.9% vs. 66.1% in the entire population, this is not sufficient to predict that a given female credit card buyer will actually be or become a member. Predictive learning method, in contrast, look only for subgroups with distributions that are almost "pure", i.e., groups where almost all members (except for noisy/ erroneous cases) have the required property. On the upside, this means that subgroup discovery does useful work even in situations where such all-or-none groups cannot be found or in situations where the distribution is very unbalanced.

Similarly, the more complex average or market share analysis variants of subgroup discovery cannot be answered directly with predictive methods. If an exact numerical predictor could be learned by a predictive method, this predictor could be used to then estimate the average and market share properties. In most cases, however, such a predictor cannot be learned while subgroup discovery still yields interesting results. Subgroup discovery thus is a useful first approach in analyzing a problem and yields a "screening" of the statistical properties of the data. As further analysis steps, one could then try to see whether predictive models can also be induced.

3.2 MIDOS technological ingredients

So how the method of MIDOS work? As explained, the algorithm is to consider all possible subgroups and report the statistically "most interesting" ones. Thus, the key ingredients are the definition of interestingness or quality, and a clever way of searching so we find the most interesting results as quickly as possible.

3.3 Quality

To find a precise and technical definition of what "statistically interesting" means, two factors are considered: the size of a group and its so-called distributional unusualness. Distributional unusualness is of course central, since the more different the statistical properties of a group are when compared to the entire population, the more interesting this group is. We are more interested in groups with 73% club members than those with 68% club members if the population average is 66.1%. However, the size of the group is equally important, because smaller groups tend to be more statistically unusual. Namely, in the extreme, a group consists of only one customer, and if this customer happened to be club member, we would have a group with 100% club members. We thus need to balance the size of the group (usually referred to as factor g) with its distributional unusualness (usually referred to as factor p). The properties of functions that combine these two factors have been extensively studied (the p-g-space [Klö96]). As an example of a popular and typical function, here is the interestingness function for the binary and multivalued case used in MIDOS:

$$\frac{g}{1-g} \cdot \sum_{i=1\ldots n} (p0_i - p_i)^2$$

Here, g is relative size of the considered subgroup with respect to the population (between 0 and 100%), $p0_i$ is the relative frequency of value $v_i$ in the entire population, $p_i$ its relative frequency in the considered subgroup. As an example, in the population of 1371 customers used above of which 478 are female credit card buyers, g would be $478/1371=0.348=34.8\%$. If we assume $v_1$ is "member" and $v_2$ is "nonmember", and 906 customers overall are members compared to 334 among female credit card buyers, $p0_1$ would be $906/1371=0.661=66.1\%$, $p0_2$ would be $465/1317=0.339=33.9\%$, $p_1$ would be $334/478=0.699=69.9\%$, and $p_2$ would be $144/478=0.301=30.1\%$. The interestingness value of female credit card buyers with respect to club membership would thus be:

$$\frac{0.348}{1-0.348} \cdot ((0.661-0.699)^2 + (0.339-0.301)^2) =$$

$$0.00153882 = 1.53882\%\%$$

(which is quite a low value). MIDOS uses this quality value to rank possible subgroups.

3.2.2 Search

The search itself is what is commonly referred to as "topdown" search. This means that MIDOS starts with the most general (largest) possible group, i.e., the entire population, and then adds restrictions to it in all possible ways, one by one until the groups have become too small. Whether a group is too small is determined by a user-given parameter called "minimal support" (see below). During the search, MIDOS always maintains a list of the $n$ highest quality solutions found so far, where $n$ is a user given parameter ("solution size"). When the entire space has been explored (or the user interrupts), this list of top solutions is returned to the user.

Figure 10:
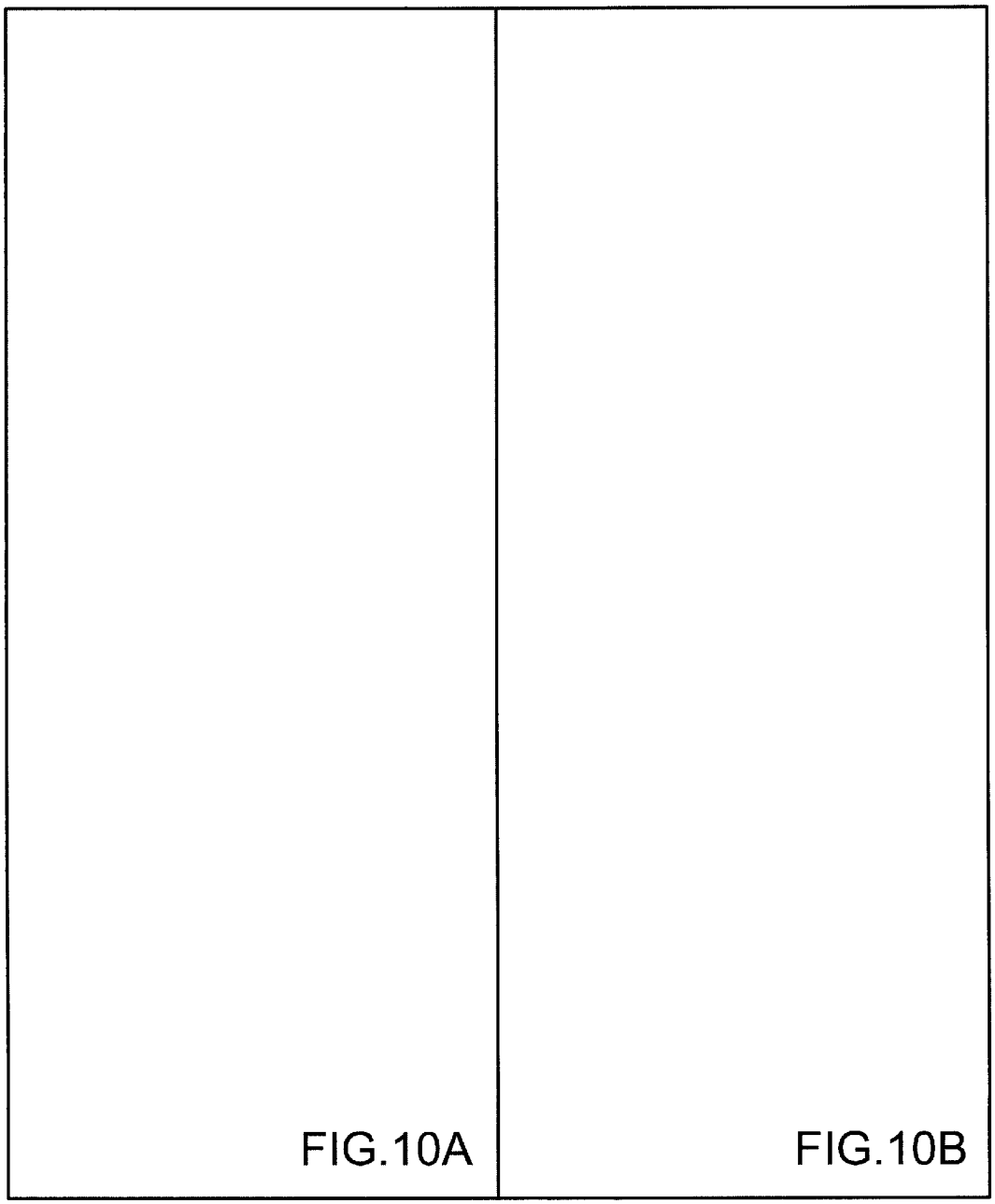
FIG. 10 and FIGS. 10A and 10B are an example for a search space for a single table ("customer") according to the invention.
Figure 10A:
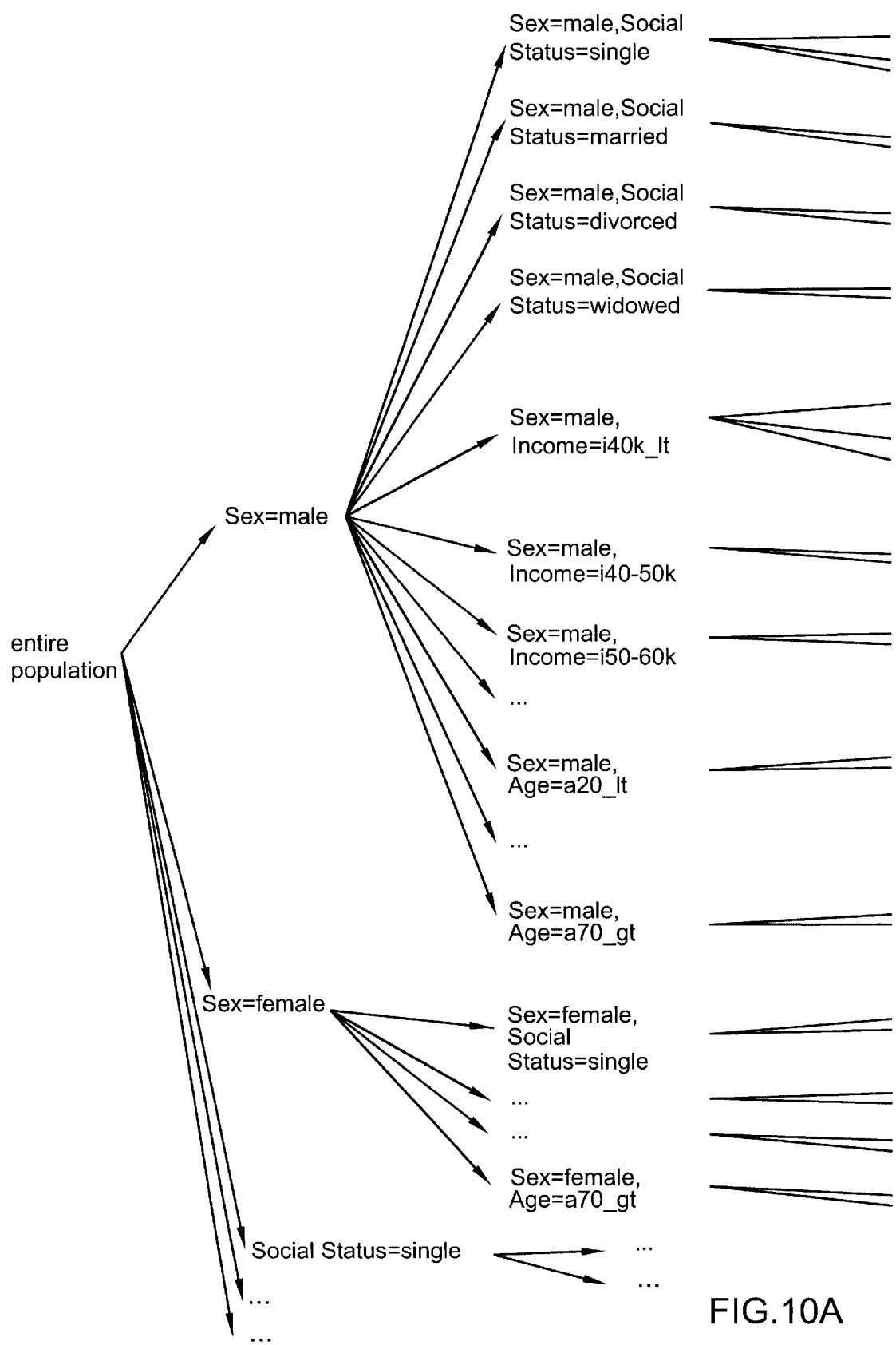
Figure 10B:
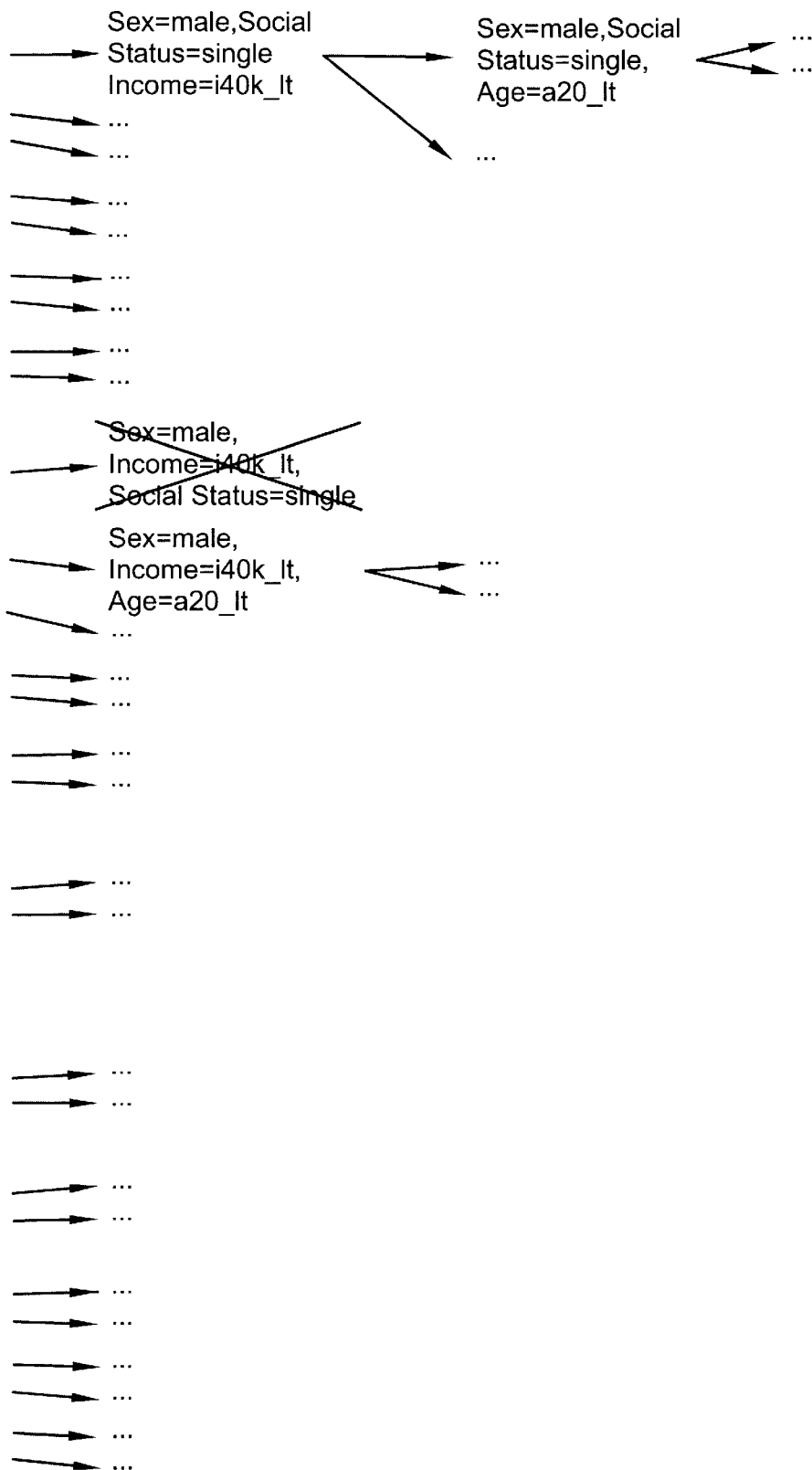
Figure 11C:
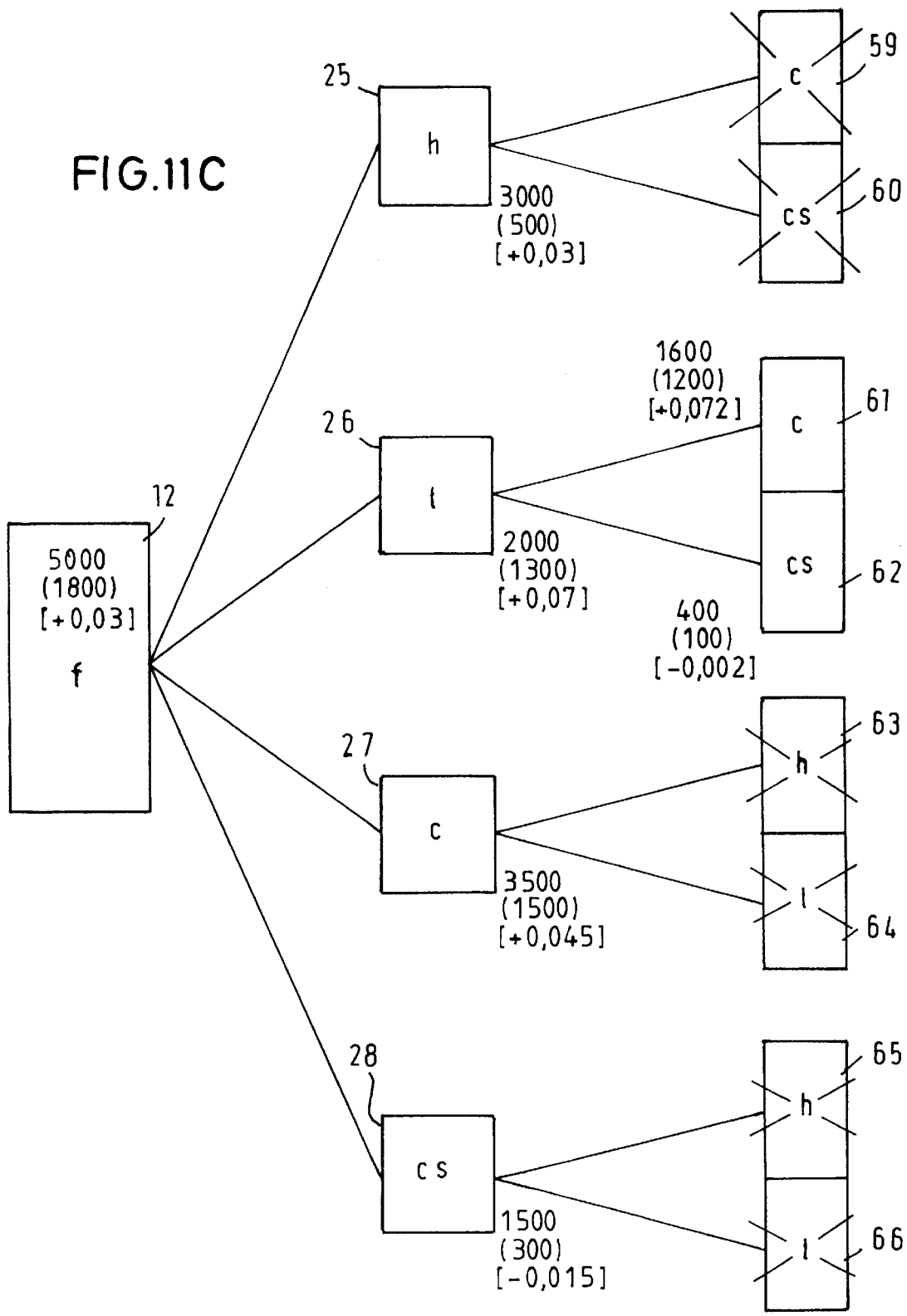
FIGS. 11A–11G are an example for a data base from which interesting groups shall be found out according to the invention, wherein the search space is also illustrated marking those groups of objects as being deleted which due to redundancies are not investigated.
Figure 11D:
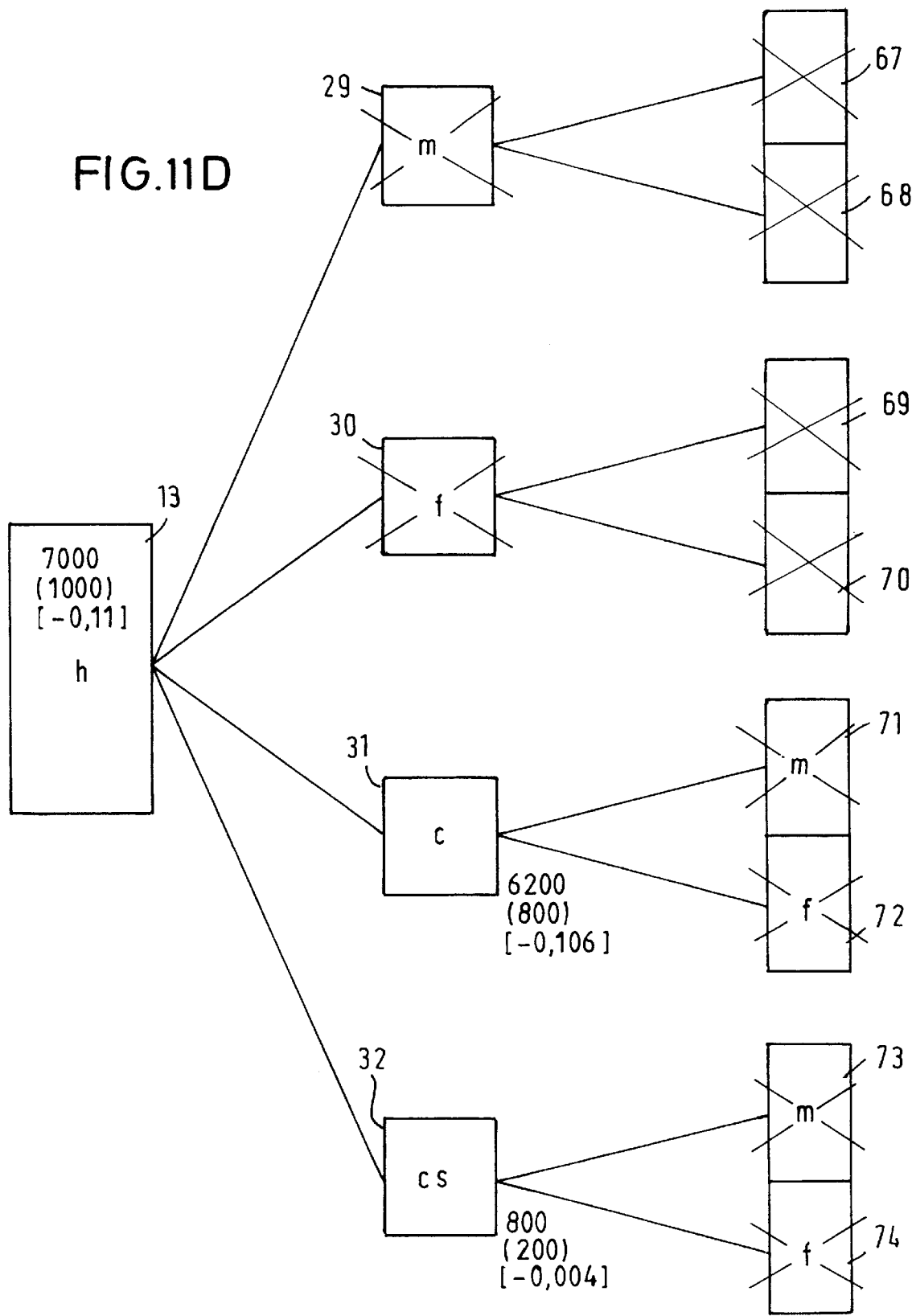
Figure 11:
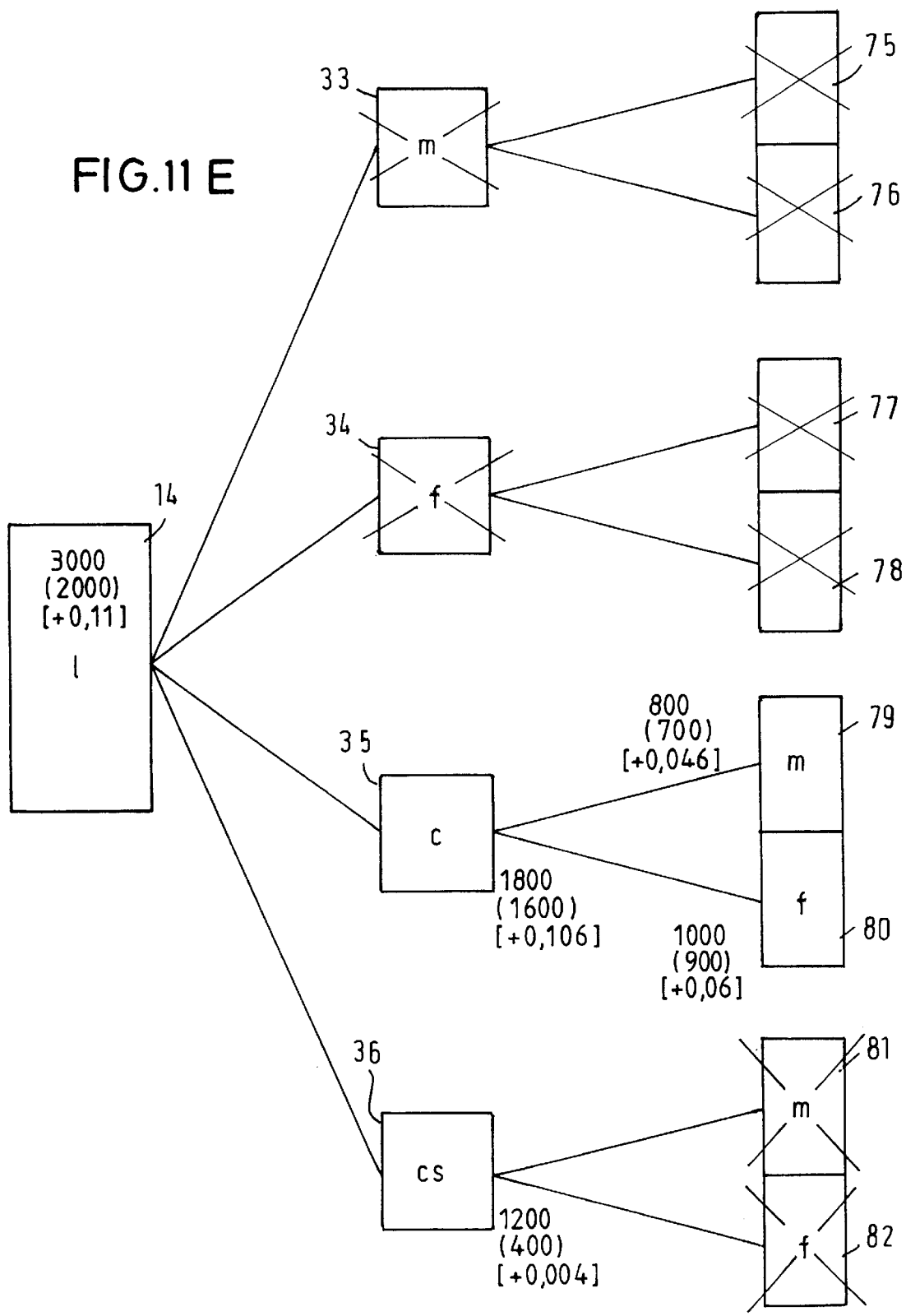
Figure 11G:
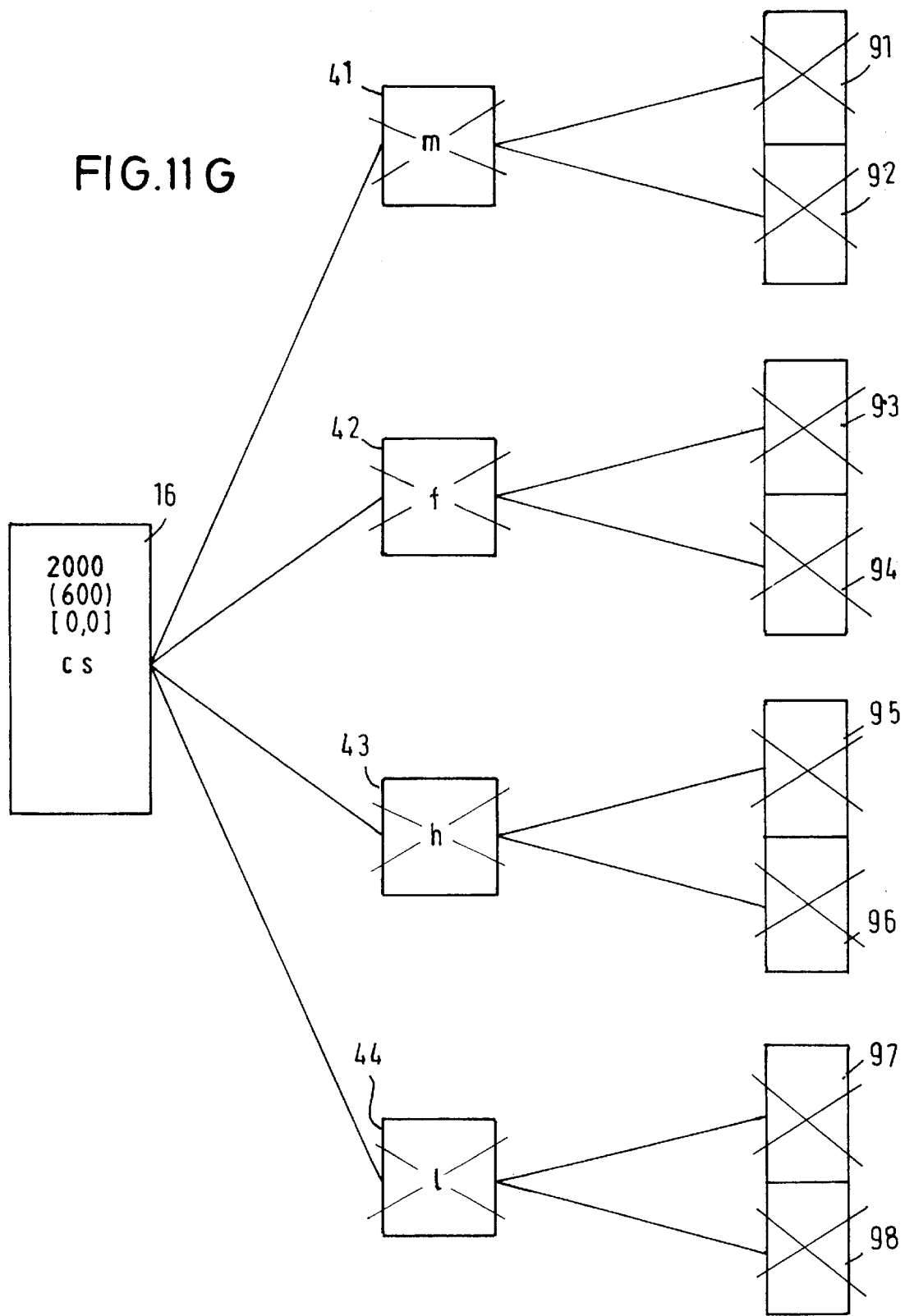

Restrictions are constructed from all the attributes of all available relations, combining relations wherever necessary. Thus, to reach the candidate "Sex=male, Income=i60_70k", MIDOS would add the restriction "Sex=male" to the group of all customers, and in a second step, add the restriction "Income=i60_70k". FIGS. 10A and 10B graphically show how MIDOS builds explores its search space for a single table.

In a similar fashion, MIDOS extends the single-table search space shown in FIGS. 10A and 10B to multiple relations by adding, instead of restrictions on individual attributes, new literals corresponding to one of the available relations. To see how this works, let us have a look at MIDOS' hypotheses in their original ILP-style form, where "Sex=male, Income=i60_70k" would be written as customer(_,_,male,_,i60_70k,_,_,_)

To bring in additional relations (or multiple copies of the same relations), MIDOS introduces a new literal that shares a variable with an existing literal. For example, to bring in the "order" relation, MIDOS would add a literal as follows:

customer(C, _,male,_,i60_70k,_,_,_),
order(C,_,_,_,_)

using the shared variable "C" to indicate that the ordering customer should be the same as the customer referred to by the first literal (a "join" of the customer and order relations on the customer ID attribute). In MIDOS' notation, the above subgroup description would read Sex=male,
Income=i60_70k,
ID=order.Customer ID In our simple customer example, there are only two relations that can be brought in in addition to customer. In a fully developed real-life application, however, there might be dozens of relations that could be added, and several attributes for which it would make sense to link (join) these relations by shared variables. For any particular analysis, we might not actually be interested in all such combinations, so if MIDOS were to try all possible combinations, a lot of search effort would be needlessly wasted. To avoid this, MIDOS requires the user to provide a list of so-called foreign links that explicitly specify the "paths" along which new relations may be introduced with shared variables. To allow MIDOS to bring in "order" as in the example above, we would have to specify the foreign link customer[1] -> order[1]

telling MIDOS that it is o.k. to bring in "order" if its first argument is linked to the first argument of "customer" with a shared variable. If we also wanted to use information about stores in our subgroups, we would also provide the foreign link order[3] -> store[1]

allowing MIDOS to form hypotheses like customer(C,_,male,_,i60_70k,_,_,_),
order(C,_,S,_,_),
store(S,_,_,_)

or, in MIDOS notation,

Sex=male,
Income=i60_70k,
ID=order.Customer ID,
order.Store ID=store.store ID

Once brought in, the attributes of new relations themselves can again be restricted in the same fashion as shown in FIGS. 10A and 10B for "customer". Thus, at some point in its search, MIDOS would for example form the subgroup candidate Sex=male,
Income=i60_70k,
ID=order.Customer ID,
order.Store ID=store.store ID,
order.Paymt Mode=cash,
store.Size=small The use of foreign links to allow the user to tell MIDOS where to search is an instance of a general approach known in ILP as "declarative bias", since it lets the user declaratively, i.e., without programming, control the search bias of the analysis algorithm. Foreign links owe their name to the close relationship to the concept of foreign keys in databases. Looking back at FIG. 6, we see that the foreign links for analysis are almost the same as the foreign key relations between the three relations, except that the first arrow runs in the other direction (since we want to start with customers for the analysis). Nonetheless, the user is of course free to also use foreign links that do not correspond to a foreign key relation in the underlying database.

3.2.3 Organization and control of the search

As described above, MIDOS explores its search space top-down starting with the shortest descriptions and adding more and more restrictions. The user can influence the search with a number of parameters as explained hereinbelow.

Minimal support. The minimal support specifies the minimal size of a subgroup as a fraction of the overall population. If we set the minimal support to 10%=0.1, MIDOS will not consider subgroups smaller than 10% of the population. This saves search time and also avoids findings that are uninteresting simply because the group is too small.

Search depth. Each restriction added by MIDOS to the initial group description (the entire population) is considered to be one step "deeper" in the search. For example,
Sex=male,
Income=i60_70k
is at depth 2, and
Sex=male,
Income=i60_70k,
ID=order.Customer ID
is at depth 3 in the search (compare FIGS. 10A and 10B where deeper levels are to the right). By setting the desired search depth, the user can control how long and complex subgroup descriptions can be. As is obvious from FIGS. 10A and 10B, increasing the depth of search greatly increases the number of subgroups that need to be considered, and thus requires significantly more execution time.

Search Mode. The default search mode of MIDOS is to explore the search space in a so-called "breadth-first" manner. This means MIDOS will first fully explore one level of the tree before starting the exploration of the next level. The user can change this to best first, meaning that MIDOS will always work on the subgroup that looks most promising at the time, independent of its depth. In most cases, this means that the most interesting hypotheses are found earlier in the search.

In addition to these-user controlled aspects of the search, MIDOS employs several optimizations to speed up the search.

Optimal refinement. This is a standard technique in search optimization: the search tree is structured in such a fashion that the same point can never be reached along more than one path. Consider the tree in FIGS. 10A and 10B. The crossed-out node already is reachable along the very top path of the tree. By organizing the search in a way such that the crossed-out node is never even produced, we avoid having to check over and over again whether a new candidate (group or subgroup) perhaps already was considered in a previous branch.

Optimistic estimate pruning. When exploring the search space from top to bottom, we cannot predict how the quality of a subgroup's descendants will develop: by adding one more restriction, we might make the group more or less unusual depending on which individuals are excluded by the new restriction. We do know, however, that groups can only get smaller, and the maximally unusual groups are those with extreme distributions where certain values do not occur at all anymore. In fact, with mathematical transformations on the quality function explained above (and other quality functions that are used for the other search tasks), we can derive a so-called optimistic estimate function that will give us an upper limit on the quality that could potentially be reached by adding more restrictions to a subgroup description. Now, if this upper limit is lower than the qualities of solutions we have found so far, we need not consider this subgroup and its restrictions any further, since we know none of them can make it to our list of top candidates. This allows entire subtrees of the search space to be pruned. The optimistic estimate function is also used in best-first search (see above) to decide where to search next.

Sampling. For very large datasets, it is important to not only limit the number of subgroups that are considered, but also limit the time taken to test each subgroup description and compute its quality. Fortunately, statistics gives us a way to consider only a part of the population and subgroup and still be reasonably certain that we do not miss any interesting subgroup. Using a basic statistical theorem, we can compute how many samples we need to draw from a subgroup to have a (say) 95% chance that our probability and size estimates are off by no more than (say) 5%. In contrast to a priori sampling, where we can never be sure which results we might have lost, this approach allows a precise control over error probability during the run.

3.2.4 Subgroup suppression

Whenever MIDOS has found an interesting subgroup and adds restrictions to it, it is quite likely that the restricted subgroups will maintain a large part of the interestingness of the original group. Consider the case where the new restriction only excludes a small percentage of the members of the original group. There, the quality values of the two groups will not differ a whole lot. For the user, this means that the smaller subgroup is not very interesting, because the restriction does not make any new interesting things happen compared to the original group. For example, if we know that single males are twice as likely to be club members than the entire population, learning that single males aged 30 to 40 are also almost twice as likely is not very interesting. However, of course it would be interesting if single males aged 30 to 40 showed the same behavior as the entire population, since that is unexcepted with respect to single males.

To account for this, MIDOS preferably incorporates a subgroup suppression mechanism that works as follows. For a new hypothesis that is good enough to be on our top solutions list, MIDOS checks the solution list to see if there are any predecessors or descendants of the new candidate already on the solution list. For each of them, the algorithm computes a so-called affinity value [Geb91] that increases with increasing overlap of the groups described by the two subgroup descriptions. If two hypotheses have high affinity, if one of them has a little higher quality (with respect to the entire population) than the other, the worse hypothesis will be suppressed unless the two hypotheses have a high quality with respect to each other. The lower the affinity value, the higher quality difference is required for suppression.

The user can influence suppression with two parameters.

Suppression factor.

The higher the suppression factor, the smaller the quality difference that suffices for suppression (with equal affinity). A suppression factor of 0 turns off suppression.

Affinity Influence. The higher this value, the more important it is how close two hypotheses are. For a value of 0, the higher quality hypothesis will suppress the lower quality hypothesis no matter how large the intersection of their groups is (so this is not a sensible setting).

Suppression is also useful for repeated analysis runs on the same or similar datasets, or in general whenever there is prior knowledge about certain subgroups. If such subgroups are given to MIDOS as previous solutions, any new subgroups that are too close to these already known solutions are suppressed, thus avoiding repeated reporting of known phenomena.

In connection with FIG. 11 and 11A–11G a preferred embodiment of the method according to the invention is described. FIGS. 11A–11G illustrate the search tree of a population of objects (in this case of people), wherein the objects are specified by the following attributes:

| attribute | abbreviation in FIGS. 11A–11G |
|---|---|
| male | m |
| female | f |
| high income | h |
| low income | l |
| city | c |
| countryside | cs |

The population 10 of objects comprises 10,000 objects which, according to the attributes mentioned above, in three steps can be divided into several groups of objects. Among the population 10 of persons, there exists 3,000 smokers, i.e. the quality of the population is 0.03. The number of persons of the individual groups are indicated in FIGS. 11A–G by the numbers without parentheses wherein the number of smokers among the people of the individual groups are indicated by a number in round parentheses. The object to be solved is to find out n groups (for example three groups) of best quality, i.e. the best n (or three) groups based on number of persons of that groups and their percentage of smokers.

The quality $Q_i$ of population and the individual groups are calculated according to the following equation:

$$Q_i = g_i(p_i - p_o)$$

wherein $g_i$ is the number of persons of an individual group (or population, respectively) divided through the number of persons of population $p_o$ is the likelihood of smokers of the population 10, and $p_i$ is the likelihood of smokers of an individual group.

The qualities of the population and the individual groups are mentioned in FIGS. 11A–G in square brackets.

As indicated in FIG. 11A, in the first step, the population 10 is divided into six groups 11–16 of first order. Among these groups 11 to 16, group 11 comprises all the male persons, while group 12 comprises all the female persons of the population 10. Moreover, group 13 comprises all the persons with a high income, while group 14 comprises all the persons with a low income. Finally, group 15 includes all the persons of the population 10 living in a city or town, while group 16 includes all the persons of the population 10 living in the countryside. The number of people of the groups 11–16 as well as the number of smokers among the persons of the individual groups 11–16 are also mentioned in FIG. 11A.

According to the invention, the quality of the individual groups 11–16 are now calculated. The groups having the three best qualities, i.e. groups 12, 14, 15, and 16 with qualities of +0.03, +0.11, 0, and 0 are extracted from the groups 11–16 of the first order. After that, according to the method of the invention, it is investigated which groups of the groups 11–16 of the first order are worth to be further divided into groups of next orders. This investigation is described above in connection with the optimistic estimate pruning mentioned in section 3.2.3. The assumption is made that upon dividing a group of first order into groups of next orders, one group can be found comprising all the smokers of the group 11. That means that such a group comprises 1,200 persons fulfilling the characteristic of interest, namely that they all are smokers. On the basis of this information (number of persons and number of persons having the characteristic of interest), a hypothetic quality is calculated. If this quality is lower than the quality of group 11 or the worst quality among the groups already extracted up to that time, then it is decided to no further divide the respective group 11. Accordingly, the search tree is pruned behind group 11.

The hypothetic qualities of all the groups of first order can be calculated as follows:

| group | actual quality | hypothetic quality |
|---|---|---|
| 11 | −0.03 | +0.084 |
| 12 | +0.03 | +0.1260 |
| 13 | −0.11 | +0.07 |
| 14 | +0.11 | +0.14 |
| 15 | 0 | +0.1680 |
| 16 | 0 | +0.042 |

In the instant case, for example the hypothetic quality with respect to group 12 is calculated. Accordingly, it is assumed that group 12 can be divided in one of the next steps into a group comprising all the 1,800 smokers of group 12. Such a (hypothetic) group would have a quality of +0.126 according to the equation mentioned above. Since this quality is higher than the worst quality of the groups already extracted (namely the quality of group 14), the search tree cannot be pruned behind group 12.

Since in this example, all the hypothetic qualities associated with groups 11–16 are higher than the two best qualities, and, accordingly, each group is worth to be divided further so that no optimistic estimate pruning occurs after the first dividing step.

As discussed above in section 3.2.3 in connection with minimal support, a further investigation is made with regard to the number of persons comprised in the individual groups 11–16. Assuming that only groups comprising at least 500 persons are of interest, one can say that after the first step of the method none of the groups 11–16 can be ignored since all of them at least comprise 500 persons each.

In the next step, the groups 11–16 of first order are divided into groups 21–44 of second order. In this second step, each group of the first order is further divided into four groups of second order. These four groups are selected in that in addition to the attribute of the respective group of first order (for example male for group 11), one further attribute is used so that group 11 results in group 21 comprising all the male persons with a high income of the population 10, group 22 comprises all the male persons having a low income of population 10, group 23 includes all the male persons of the population 10 living in the city and group 24 comprises all the male persons of the population 10 living in the countryside. Group 12 is divided in a similar manner without any redundancies between groups 21–24 of second order resulting from group 11 of first order and groups 25–28 of second order resulting from group 12 of first order. However, when further dividing group 13 of first order into groups 29–32 of second order, one can see that for example group 29 comprises persons specified by the same attributes as group 22 derived from group 11. Accordingly, it is clear that not all the groups of second order have to be investigated with regard to their quality to solve the task. This feature is discussed in section 3.2.3 in connection with optimal refinement. All the groups which according to the optimal refinement requirement have not be investigated further, are crossed-out in FIGS. 11B–11G.

The actual and hypothetic qualities of the valid ones of groups 21 to 44 are as follows:

| group | actual quality | hypothetic quality |
|---|---|---|
| 21 | +0.04 | +0.056 |
| 22 | +0.01 | +0.028 |
| 23 | −0.045 | +0.063 |
| 24 | +0.015 | +0.021 |
| 25 | +0.03 | +0.035 |
| 26 | +0.07 | +0.091 |
| 27 | +0.045 | +0.105 |
| 28 | −0.015 | +0.021 |
| 31 | −0.106 | +0.056 |
| 32 | −0.004 | +0.014 |
| 35 | +0.106 | +0.112 |
| 36 | +0.004 | +0.028 |

At this time, the groups with the best three qualities among the already extracted groups 12,14,15, and 16 of first order and the valid groups of second order are groups 14,35, and 26 having qualities of +0.11, +0.106, and +0.07. The hypothetic qualities associated with groups 21–25,28–32, and 36 are lower than the worst quality (+0.07) of the groups 14,35, and 26 with the three best qualities so that the search tree due to the optimistic estimate feature of the invention, can be pruned behind groups 21–25,28–32, and 36, each. Accordingly, the groups which in a next step can be derived from these groups are crossed-out in FIGS. 11A–11G.

When regarding the valid ones of groups 21–44 of second order, one can see that the minimal support requirement now plays a more significant role. As mentioned above, only groups comprising at least 500 people are of interest. Accordingly, group 21 of second order is not relevant. In particular, all the groups which result from group 21 by further dividing the same are of no relevance. Accordingly, the search tree can be pruned already at group 21.

As one can see, applying the requirements of optimistic estimate, minimal support and optimal refinement on the search tree can be the reason for "multiple deletion" of groups as in case of groups 24,28, and 32.

After having deleted some of the groups of groups 21–44 due to not fulfilling the optimal refinement, minimal support or optimistic estimate requirement, the method is continued by estimating or calculating the quality of the remaining groups of second order. The rank in which these remaining subgroups are investigated may be fixed or variable and, in particular, depends on the rank of the qualities of the subgroups of first order from which they are derived. In particular, there are also mathematical models deciding due to statistical rules which of the groups shall be used preferably for calculating their qualities.

In the last step, all the procedures described before are applied on the remainders of groups 51–98 to determine which of the remaining groups 60–62,79,80 of third order are worth to be examined in detail. Those groups 51–98 which would result from a non valid group of second order are not derived and examined and are crossed-out in FIGS. 11A–11G. At this time, the actual list of groups with the three best qualities comprises groups 14,35, and 26 with qualities of +0.11, +0.106, and +0.07. Group 61 of third order is the only group having a better quality than the worst quality of the groups actually detected, namely better than group 26. Moreover, group 62 comprises less objects than 500 (required minimum number of people per group of interest) and also due to this reason cannot be included in the list of groups with the three best qualities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for detecting a selectable number of groups of objects having at least one selectable characteristic from a population of objects specifiable by a plurality of attributes, each of said object groups having a quality which, by means of a selectable function, results from the number of objects of the object group and from an unusualness of the distribution of the at least one characteristics within the object group and which is detected by a relation between the distribution of the characteristics of the respective object group and the distribution of the characteristics in a reference population, said method comprising the following steps:

a) selecting the at least one characteristic by selecting at least one of the attributes specifying the objects of the population, b) subdividing the objects of the population into object groups of a first order, on the basis of respectively at least one attribute, c) detecting the quality of each object group of this order, on the basis of the total number of its objects and the number of its objects having said at least one characteristic and/or the number of its objects not having said characteristic, d) for each object group, including the object group of this order into the number of object groups to be detected, if the object group has a quality higher than the lowest quality of the object group among the object groups detected up to this point, e) for each object group of this order, detecting at least one hypothetical first quality on the basis exclusively of those objects of this object group which have at least one of said characteristics, and/or at least one hypothetical second quality on the basis exclusively of those objects of this object group which do not have at least one of said characteristics, wherein the at least one of the first or second qualities is a quality of a hypothetical group derived from the actually processed group and comprising exclusively the objects thereof having one or not having one of said at least one characteristics, f) subdividing all those object groups of this order the at least one of the respectively assigned first or second hypothetical qualities of which comprise a selectable quality value and particularly are of the quality of the respective object groups, into object groups of the next lower order, by selecting at least one attribute, and g) repeating steps c) to f) as often as a selectable criterion for termination has been reached.

2. The method according to claim 1, characterized in that in step d) an object group is included into the number of object groups to be detected only if it is additionally verified that this object group comprises a selectable first minimum number of objects.

3. The method according to claim 1, characterized in that in step e) the first or second hypothetical quality is detected only if the number of objects having said characteristic comprises a selectable second minimum number.

4. The method according to claim 2, characterized in that the first minimum number is equal to the second minimum number.

5. The method according to claim 1, characterized in that the criterion for termination is defined in that the object groups are subdivided until at a subdivision stage no attributes exist anymore for a further subdividing into object groups.

6. The method according to claim 1, characterized in that the criterion for termination is defined in that the subdividing of object groups into the next lower order results exclusively in object groups whose number is smaller than a selectable third minimum number.

7. The method according to claim 2, characterized in that the third minimum number is equal to the first or the second minimum number.

8. The method according to claim 1, characterized in that the criterion for termination is defined to be the lapse of a selectable period of time.

9. The method according to claim 1, characterized in that the object groups at each subdivision stage according to steps c) to f) are processed in the order of their qualities and/or in the order of their first and/or second hypothetical qualities, with the object group having the highest quality and respectively hypothetical quality being processed first.

10. The method according to claim 1, characterized in that at each subdivision stage the object groups are processed according to a selectable scheme, particularly a scheme being different from one subdivision stage to the next one.

11. The method according to claim 1, characterized in that at each subdivision stage it is examined, on the basis of the combination of the attributes defining the object groups, whether a plurality of object groups with the same combination of attributes exist, and, if such is the case, only one of those object groups is examined and, depending on the results of such examinations, is further subdivided.

12. The method according to claim 1, characterized in that in step d) an object group is included into the number of object groups to be detected only if it is additionally verified that the attributes of this object group differ from those of the object group detected up to this point at least by a predeterminable minimum distance.

13. The method according to claim 1, characterized in that the attributes of the objects of the population are included in a relational database, especially in interlinked listings or the like.

* * * * *